US010793143B2

(12) United States Patent
Lee et al.

(10) Patent No.: US 10,793,143 B2
(45) Date of Patent: Oct. 6, 2020

(54) PARKING SYSTEM FOR VEHICLE AND VEHICLE

(71) Applicant: LG Electronics Inc., Seoul (KR)

(72) Inventors: Jinkyo Lee, Seoul (KR); Daebum Kim, Seoul (KR); Ilho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 15/857,143

(22) Filed: Dec. 28, 2017

(65) Prior Publication Data

US 2018/0339700 A1 Nov. 29, 2018

(30) Foreign Application Priority Data

May 29, 2017 (KR) .................. 10-2017-0066275

(51) Int. Cl.
*B60W 30/06* (2006.01)
*B62D 15/02* (2006.01)
*G06K 9/00* (2006.01)

(52) U.S. Cl.
CPC ........... *B60W 30/06* (2013.01); *B62D 15/027* (2013.01); *B62D 15/0285* (2013.01); *G06K 9/00362* (2013.01); *G06K 9/00798* (2013.01); *G06K 9/00812* (2013.01); *G06K 9/00825* (2013.01)

(58) Field of Classification Search
CPC . B60W 30/06; B62D 15/027; B62D 15/0285; G06K 9/00362; G06K 9/00798; G06K 9/00812; G06K 9/00825
See application file for complete search history.

(56) References Cited

U.S. PATENT DOCUMENTS

| 2015/0179075 A1 | 6/2015 | Lee | |
| 2016/0280263 A1* | 9/2016 | Mori | G01S 15/931 |
| 2017/0129486 A1* | 5/2017 | Nakada | B60W 30/06 |

FOREIGN PATENT DOCUMENTS

| DE | 112015003053 | 3/2017 | |
| EP | 2772414 A2 * | 9/2014 | ......... B62D 15/0285 |
| EP | 2927080 | 10/2015 | |
| JP | 2006160194 | 6/2006 | |
| JP | 2009196408 | 9/2009 | |

(Continued)

OTHER PUBLICATIONS

European Search Report dated Nov. 2, 2018, on European Patent application No. 18174586.0, dated Nov. 11, 2018, 8 pages.

*Primary Examiner* — Hussein Elchanti
(74) *Attorney, Agent, or Firm* — Fish & Richardson P.C.

(57) ABSTRACT

A parking system for a vehicle that is configured to perform a parallel parking maneuver and that includes: an object detection apparatus; at least one processor; and a computer-readable medium having stored thereon instructions that, when executed by the at least one processor, cause the at least one processor to perform operations that include: determining, through the object detection apparatus, information regarding at least one nearby parked vehicle; setting at least one edge point of the at least one nearby parked vehicle based on the information regarding the at least one parked vehicle; setting a reference line based on the set at least one edge point of the at least one parked vehicle; and providing a control signal to control the vehicle to perform a parallel parking maneuver with a body of the vehicle passing through the set reference line.

14 Claims, 22 Drawing Sheets

(56) References Cited

FOREIGN PATENT DOCUMENTS

| KR | 2014079984 | 6/2014 |
| KR | 2016022678 | 3/2016 |
| KR | 2016147557 | 12/2016 |

* cited by examiner

PARKING SYSTEM FOR VEHICLE AND VEHICLE

CROSS-REFERENCE TO RELATED APPLICATION

This application claims the benefit of an earlier filing date and right of priority to Korean Patent Application No. 10-2017-0066275, filed on May 29, 2017 in the Korean Intellectual Property Office, the disclosure of which is incorporated herein by reference.

TECHNICAL FIELD

The present disclosure relates to a parking system for a vehicle.

BACKGROUND

A vehicle is an apparatus that moves in a direction desired by a user riding therein. A representative example of a vehicle is an automobile.

Vehicles typically implement various types of user-convenience systems. For example, there have been efforts to develop automated vehicle parking systems that facilitate parking of a vehicle. In particular, research has been conducted into parking systems that not only assist a driver to perform manual parking, but also to perform autonomous parking of the vehicle.

SUMMARY

Implementations are disclosed herein that enable a parking system for a vehicle that controls the vehicle to be parallel parked based on analyzing the location and/or orientation of objects in the surrounding environment of the vehicle, such as other parked vehicles or nearby structures.

In one aspect, a parking system for a vehicle is configured to perform a parallel parking maneuver and includes: an object detection apparatus; at least one processor; and a computer-readable medium having stored thereon instructions that, when executed by the at least one processor, cause the at least one processor to perform operations that include: determining, through the object detection apparatus, information regarding at least one nearby parked vehicle; setting at least one edge point of the at least one nearby parked vehicle based on the information regarding the at least one parked vehicle; setting a reference line based on the set at least one edge point of the at least one parked vehicle; and providing a control signal to control the vehicle to perform a parallel parking maneuver with a body of the vehicle passing through the set reference line.

In some implementations, the operations further include: based on the reference line and based on a direction of orientation in which the vehicle will be oriented upon completion of parking, generating information regarding a predicted position that the vehicle will be in upon completion of parking; and providing the control signal to control the vehicle to perform the parallel parking maneuver based on the information regarding the predicted position of the vehicle.

In some implementations, generating the information regarding the predicted position of the vehicle includes: generating the information regarding the predicted position so that the vehicle, when parked, has a direction of orientation between −7 degrees and +7 degrees relative to the set reference line.

In some implementations, the operations further include: determining, through the object detection apparatus, information regarding a structure determined to be nearby the set reference line; and generating the information regarding the predicted position of the vehicle such that, in the predicted position of the vehicle, a portion of the vehicle that is closest to the structure is greater than a threshold distance from the structure.

In some implementations, the operations further include: determining, through the object detection apparatus, information regarding a curb adjacent to the at least one nearby parked vehicle; based on information regarding the curb adjacent to the at least one nearby parked vehicle and based on the information regarding a direction of orientation in which the vehicle will be oriented upon completion of parking, generating information about a predicted position that the vehicle will be in upon completion of parking; and providing the control signal so that the vehicle is parked based on the information about the predicted position that the vehicle will be in upon completion of parking.

In some implementations, generating the information regarding the predicted position of the vehicle includes: generating the information regarding the predicted position so that the vehicle, when parked, has a direction of orientation between −7 degrees and +7 degrees relative to a line that defines a longitudinal edge of the curb adjacent to the at least one nearby parked vehicle.

In some implementations, setting the at least one edge point of the at least one nearby parked vehicle includes: comparing a travelling trajectory of the vehicle and a position of the at least one nearby parked vehicle during sensing of an available parking space.

In some implementations, the operations further include: determining, through the object detection apparatus, information regarding a first nearby parked vehicle; during sensing of an available parking space, setting a first edge point for the first nearby parked vehicle as a portion of a first exterior side of the first nearby parked vehicle that is farthest from the vehicle in a left-right direction, the first exterior side of the first nearby parked vehicle being an exterior side of the first nearby parked vehicle that is closest to the vehicle among an exterior front side, an exterior rear side, an exterior left side, and an exterior right side of the first nearby parked vehicle; setting the reference line for the parallel parking maneuver to extend in a front-rear direction from the first edge point of the first nearby parked vehicle; and providing the control signal to control the vehicle to perform the parallel parking maneuver toward a front side or a rear side of the first nearby vehicle based on the first reference line.

In some implementations, setting the reference line to extend in a front-rear direction from the first edge point of the first nearby parked vehicle includes: setting the reference line to extend from the first edge point of the first nearby parked vehicle in the front-rear direction along a heading direction of the vehicle.

In some implementations, the operations further include: determining, through the object detection apparatus, first information regarding a first nearby parked vehicle, and second information regarding a second nearby parked vehicle; and providing the control signal to control the vehicle to perform the parallel parking maneuver so that the vehicle is parallel parked in a space between the first nearby parked vehicle and the second nearby parked vehicle.

In some implementations, setting the at least one edge point of the at least one nearby parked vehicle includes: setting a first edge point of the first nearby parked vehicle based on the first information, and setting a second edge point of the second nearby parked vehicle based on the second information; setting the reference line based on the set at least one edge point of the at least one parked vehicle includes: setting a first reference line based on the first edge point, and setting a second reference line based on the second edge point; and providing the control signal to control the vehicle to perform the parallel parking maneuver includes providing the control signal so that the vehicle is parallel parked in the space between the first nearby vehicle and the second nearby vehicle based on the first reference line and the second reference line.

In some implementations, providing the control signal to control the vehicle to perform the parallel parking maneuver includes: based on the first reference line and the second reference line coinciding with each other, providing the control signal to control the vehicle to perform the parallel parking maneuver so that the vehicle is parallel parked with the body of the vehicle passing through the first reference line.

In some implementations, the operations further include: based on the first reference line and the second reference line not coinciding with each other; setting a third reference line positioned in a middle portion between the first reference line and the second reference line; and providing the control signal to control the vehicle to perform the parallel parking maneuver so that the vehicle is parallel parked with a body of the vehicle passing through the third reference line.

In some implementations, the operations further include: setting the first reference line, during sensing of a parking space, to extend from the first edge point of the first nearby parked vehicle in a front-rear direction along a heading direction of the vehicle; and setting the second reference line, during sensing of the available parking space, to extend from the second edge point of the second nearby parked vehicle in the front-rear direction along the heading direction of the vehicle.

In some implementations, providing the control signal to control the vehicle to perform the parallel parking maneuver includes: based on the space between the first nearby parked vehicle and the second nearby parked vehicle having a size corresponding to parking a single vehicle, providing the control signal so that the vehicle is parallel parked in a middle portion between the first nearby parked vehicle and the second nearby parked vehicle.

In some implementations, providing the control signal to control the vehicle to perform the parallel parking maneuver includes: based on the space between the first nearby parked vehicle and the second nearby parked vehicle having a size corresponding to parking two or more vehicles, providing the control signal so that the vehicle is parallel parked closer to the first nearby parked vehicle than the second nearby parked vehicle.

In some implementations, the operations further include: determining, through the object detection apparatus, information regarding a curb that is adjacent to the at least one nearby parked vehicle; and providing the control signal to control the vehicle to perform the parallel parking maneuver so that the vehicle is parallel parked within a first distance range from the curb that is adjacent to the at least one nearby parked vehicle.

In some implementations, the operations further include: receiving information regarding whether there is a person sitting in a passenger seat of the vehicle; and based on the information regarding whether there is a person sitting in the passenger seat of the vehicle, adjusting the first distance range within which the vehicle is parallel parked from the curb that is adjacent to the at least one nearby parked vehicle.

In some implementations, the operations further include: determining, through the object detection apparatus, information regarding a wall that is adjacent to the at least one nearby vehicle; and providing the control signal to control the vehicle to perform the parallel parking maneuver so that the vehicle is parallel parked within a second distance range from the wall that is adjacent to the at least one nearby parked vehicle.

In some implementations, the operations further include: receiving information regarding whether there is a person sitting in a passenger seat of the vehicle; and based on the information regarding whether there is a person sitting in the passenger seat of the vehicle, adjusting the second distance range within which the vehicle is parked from the wall that is adjacent to the at least one nearby parked vehicle.

In another aspect, a parking system for a vehicle is configured to perform a parallel parking maneuver, and includes: an object detection apparatus configured to generate information regarding at least one nearby parked vehicle; and at least one processor. The at least one processor is configured to: set at least one edge point of the at least one nearby parked vehicle based on the generated information regarding the at least one nearby parked vehicle; set a reference line based on the at least one edge point of the at least one nearby parked vehicle; and provide a control signal to control the vehicle to perform a parallel parking maneuver with a body of the vehicle passing through the set reference line.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
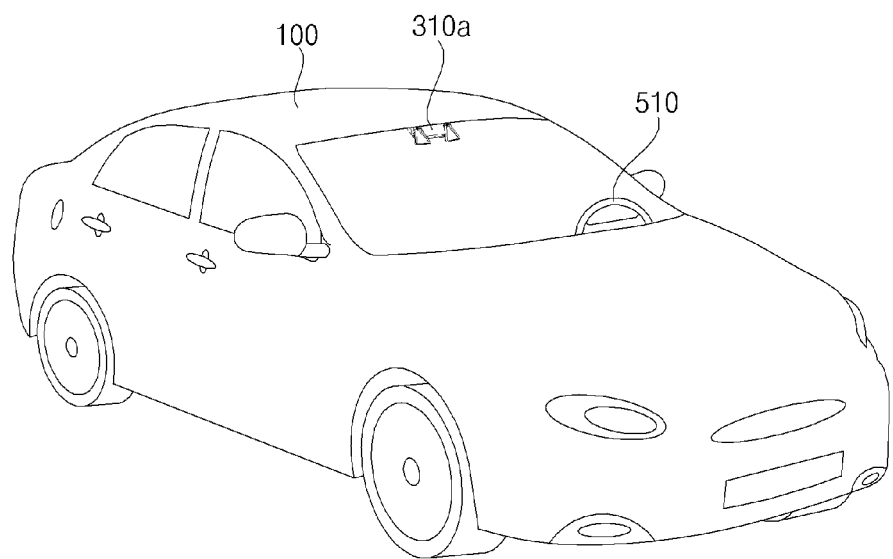
FIG. 1 is a diagram illustrating an example of an external appearance of a vehicle according to an implementation.
Figure 1:
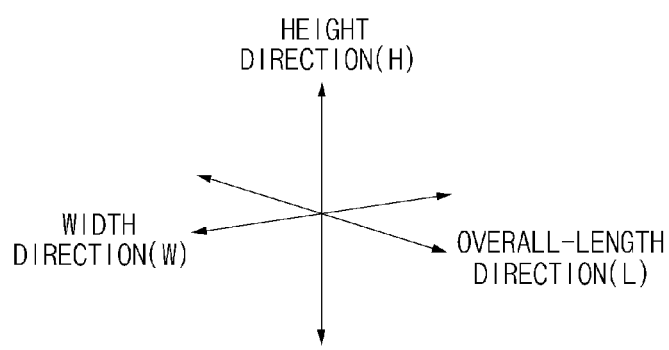

Implementations are disclosed herein that enable an automated vehicle parking system. The parking system controls the vehicle to be parallel parked based on analyzing the location and/or orientation of objects in the surrounding environment of the vehicle, such as other parked vehicles or nearby structures.

In some vehicle parking systems, a vehicle is controlled to be automatically parked based on visible parking lines, such as visible parking lines marked on the ground in a parking lot. However, when performing parallel-parking in a space having no parking lines, such parking systems may be limited, and may malfunction or fail to park a vehicle.

Implementations described herein address such challenges by providing a vehicle parking system that is configured to automatically park a vehicle even in scenarios where visible parking lines may not exist. In some implementations, the vehicle parking system may analyze the surrounding environment of the vehicle to automatically park the vehicle in an appropriate and safe manner, even in areas where parking lines are not marked or are not visible.

In some implementations, the vehicle parking system described herein analyzes nearby parked vehicles to establish a reference line by which the system automatically parks the vehicle, relative to those nearby parked vehicles. For example, the reference line may be established based on determining relevant edge points of those nearby parked vehicles. Because the reference line is determined by the vehicle parking system to facilitate automated parking, and may not necessarily correspond to an actual marked line in the environment, the reference line is sometimes referred to herein as a "virtual" reference line.

In some implementations, the vehicle parking system may also acquire information about nearby structures, such as walls or curbs, and perform parking based on such additional information. As such, the vehicle parking system may be configured to automatically park the vehicle in various types of geographic scenarios.

In some scenarios, implementations described herein have one or more effects as follows.

First, the vehicle parking system may perform a parallel parking maneuver even in a space having no parking line.

Second, the vehicle parking system may park a vehicle at a greater distance from a roadway compared to other parked vehicles, thereby preventing damage to the vehicle by an external factor.

Third, the vehicle parking system may facilitate a person sitting in the passenger seat to exit the vehicle without inconvenience.

Effects of the present disclosure, however, are not limited to the aforementioned effects and other unmentioned effects may be provided by implementations disclosed herein.

A vehicle as described in this specification may include any suitable motorized vehicle, such as an automobile or a motorcycle. Hereinafter, a description will be given based on an example of an automobile.

A vehicle as described in this specification may be powered by any suitable power source, and may include as examples an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an implementation.

Figure 2:
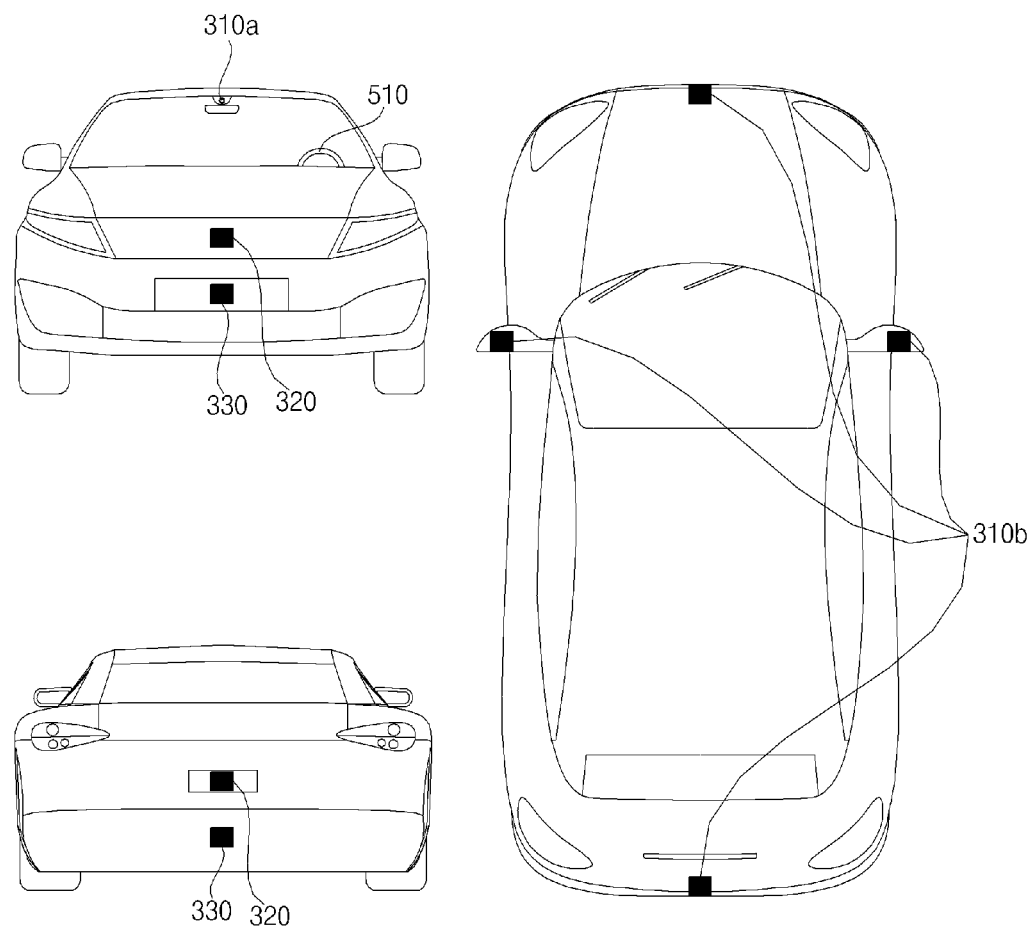
FIG. 2 is a diagram illustrating an example of different angled views of a vehicle according to an implementation.

FIG. 2 is different angled views of a vehicle according to an implementation.

Figure 3:
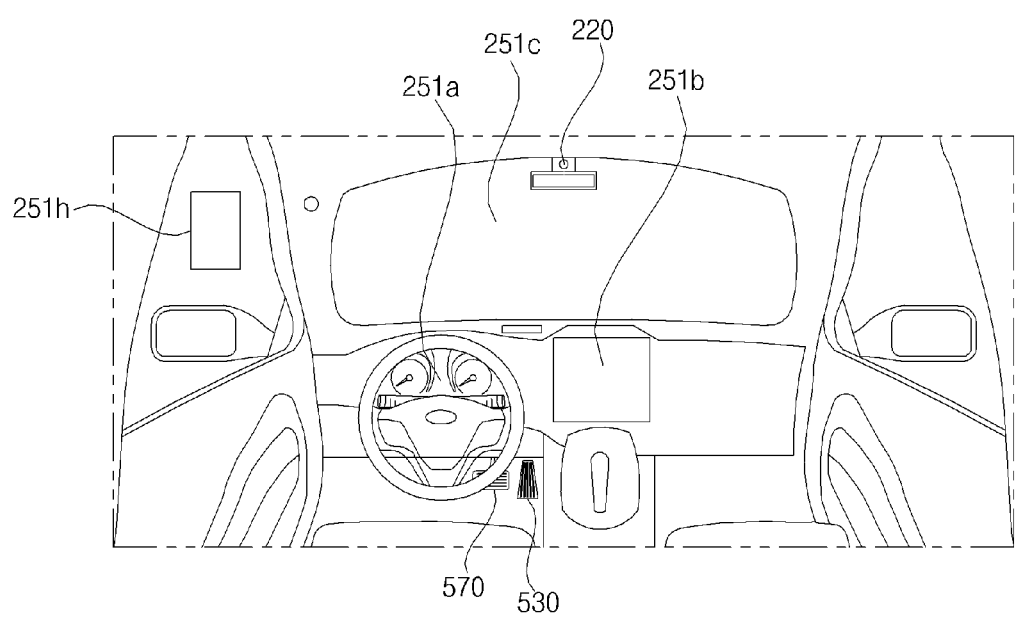
FIGS. 3 and 4 are diagrams illustrating examples of the internal configuration of a vehicle according to an implementation.
Figure 4:
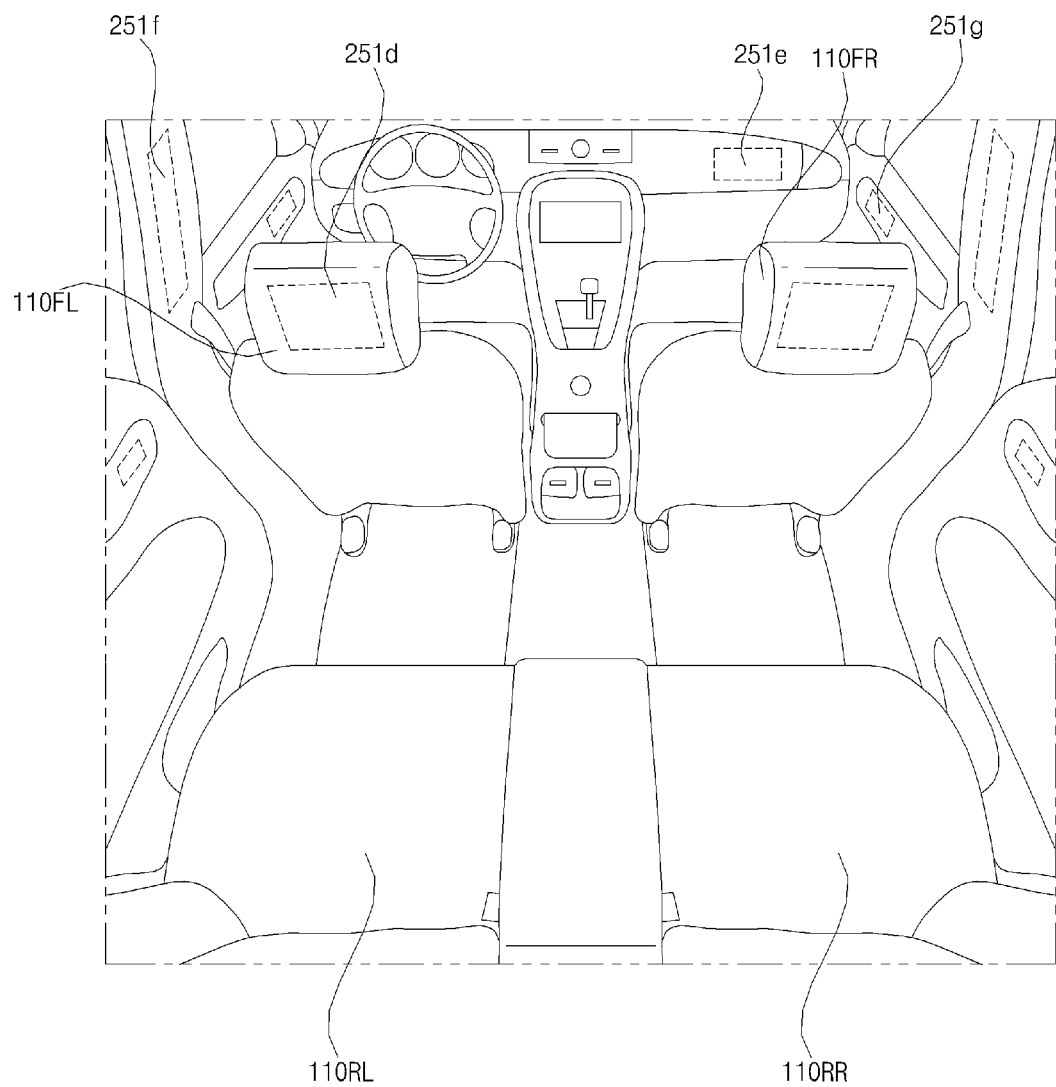

FIGS. 3 and 4 are views of the internal configuration of a vehicle according to an implementation.

Figure 5:
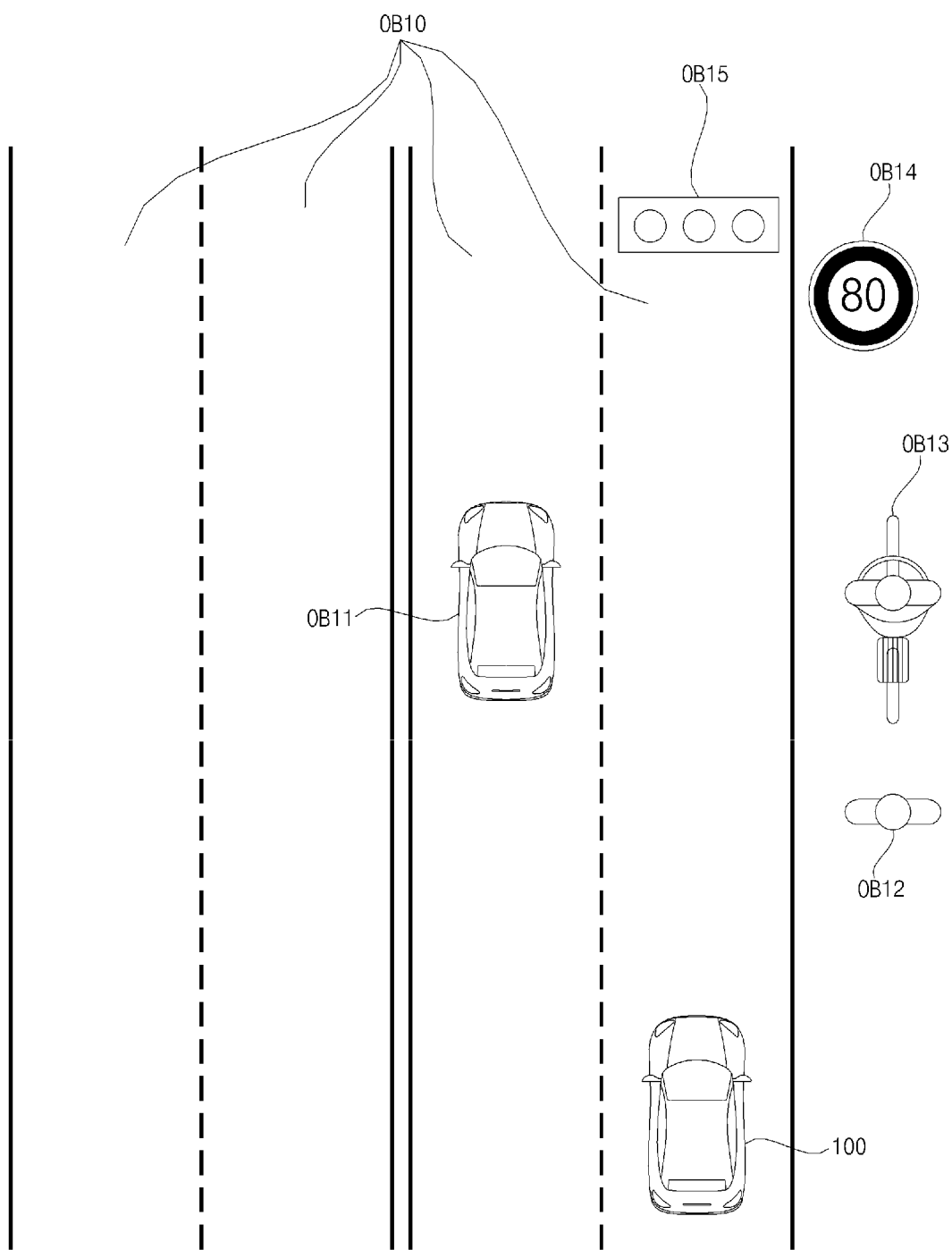
FIGS. 5 and 6 are diagrams illustrating examples of objects that are detected by a vehicle according to an implementation.
Figure 6:
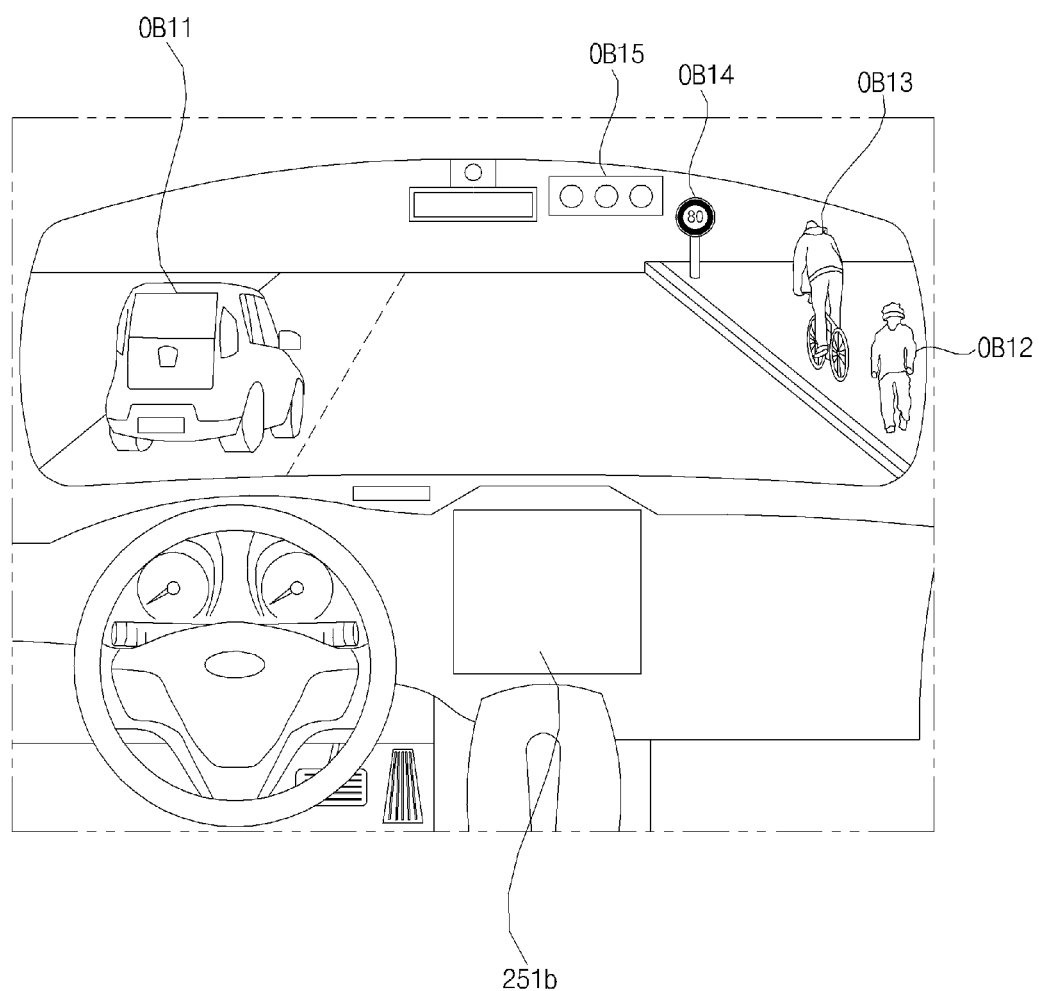

FIGS. 5 and 6 are views for explanation of objects according to an implementation.

Figure 7:
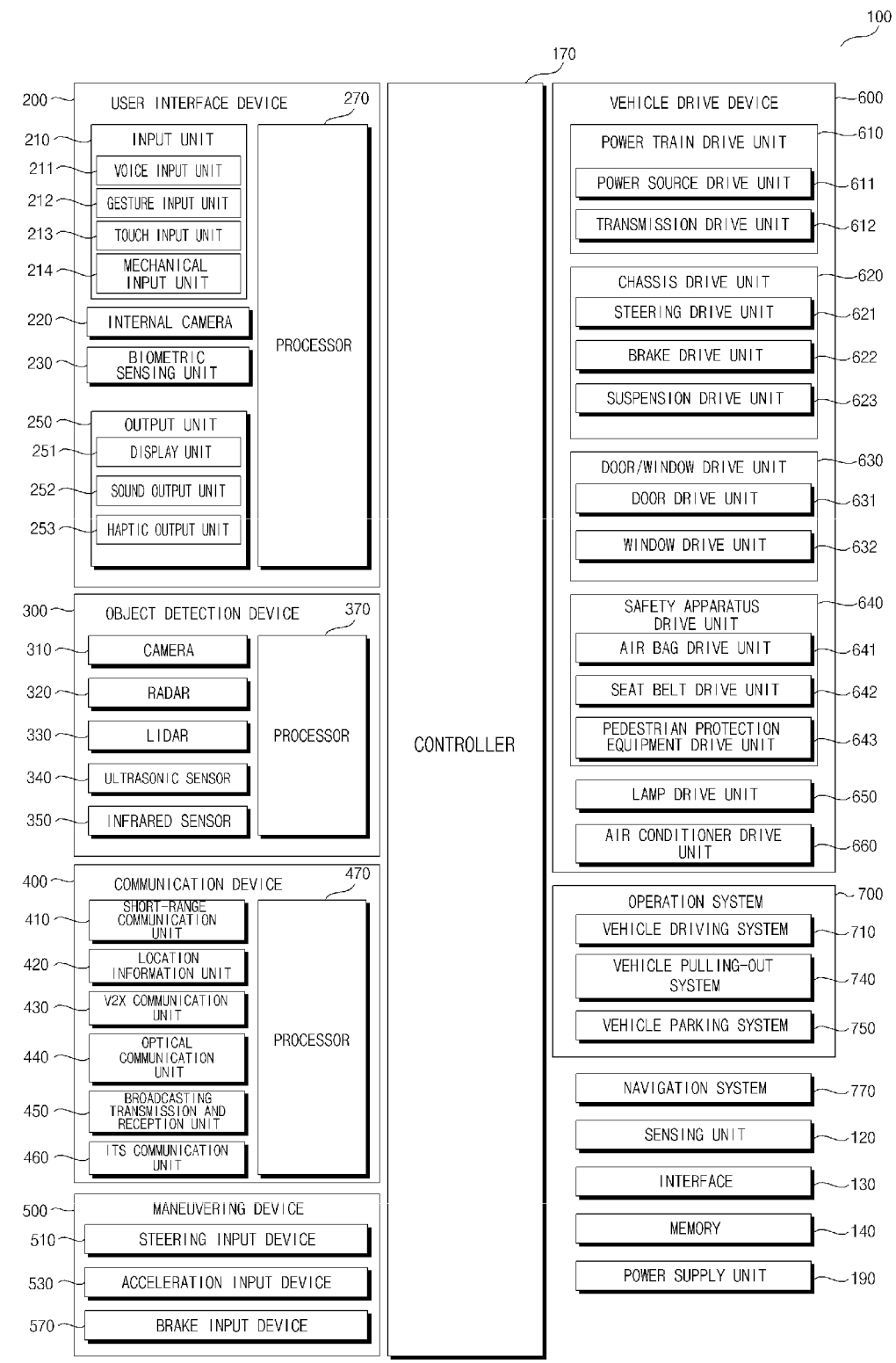
FIG. 7 is a block diagram illustrating an example of a vehicle according to an implementation.

FIG. 7 is a block diagram illustrating a vehicle according to an implementation.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may switch to an autonomous driving mode or a manual mode in response to a user input.

For example, in response to a user input received through a user interface apparatus 200, the vehicle 100 may switch from a manual mode to an autonomous driving mode, or vice versa.

The vehicle 100 may switch to the autonomous driving mode or to the manual mode based on driving situation information.

The driving situation information may include at least one of the following: information on an object located outside the vehicle 100, navigation information, and vehicle state information.

For example, the vehicle 100 may switch from the manual mode to the autonomous driving mode, or vice versa, based on driving situation information generated by the object detection apparatus 300.

For example, the vehicle 100 may switch from the manual mode to the autonomous driving mode, or vice versa, based on driving situation information received through a communication apparatus 400.

The vehicle 100 may switch from the manual mode to the autonomous driving mode, or vice versa, based on information, data, and a signal provided from an external device.

When the vehicle 100 operates in the autonomous driving mode, the autonomous vehicle 100 may operate based on a vehicle travel system 700.

For example, the autonomous vehicle 100 may operate based on information, data, or signals generated by a driving system 710, a parking-out system 740, and a parking system 750.

While operating in the manual mode, the autonomous vehicle 100 may receive a user input for driving of the vehicle 100 through a driving manipulation apparatus 500.

In response to the user input received through the driving manipulation apparatus 500, the vehicle 100 may operate.

The term "overall length" refers to the length from the front end to the rear end of the vehicle 100, the term "overall width" refers to the width of the vehicle 100, and the term "overall height" refers to the height from the bottom of the wheel to the roof.

In the following description, the term "overall length direction L" refers to the reference direction for the measurement of the overall length of the vehicle 100, the term "overall width direction W" refers to the reference direction for the measurement of the overall width of the vehicle 100, and the term "overall height direction H" refers to the reference direction for the measurement of the overall height of the vehicle 100.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, at least one processor such as controller 170, and a power supply unit 190.

In some implementations, the vehicle 100 may further include other components in addition to the aforementioned components, or may not include some of the aforementioned components.

The user interface apparatus 200 is provided to support communication between the vehicle 100 and a user. The user interface apparatus 200 may receive a user input, and provide information generated in the vehicle 100 to the user. The vehicle 100 may enable User Interfaces (UI) or User Experience (UX) through the user interface apparatus 200.

The user interface apparatus 200 may include an input unit 210, an internal camera 220, a biometric sensing unit 230, an output unit 250, and at least one processor, such as a processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense a 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a preset screen with a preset transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface apparatus 200 may include a plurality of display units 251a to 251g.

The display unit 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface apparatus 200.

In some implementations, the user interface apparatus 200 may include a plurality of processors 270 or may not include the processor 270.

In the case where the user interface apparatus 200 does not include the processor 270, the user interface apparatus 200 may operate under control of the controller 170 or a processor of a different device inside the vehicle 100.

In some implementations, the user interface apparatus 200 may be referred to as a display device for vehicle.

The user interface apparatus 200 may operate under control of the controller 170.

The object detection apparatus 300 is configured to detect an object outside the vehicle 100. The object detection apparatus 300 may generate information on the object based on sensing data.

The information on the object may include information about the presence of the object, location information of the object, information on a distance between the vehicle 100 and the object, and information on a speed of movement of the vehicle 100 relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane. The lane may include an intersection.

The nearby vehicle OB11 may be a vehicle that is travelling in the vicinity of the vehicle 100. The nearby vehicle OB11 may be a vehicle within a preset distance from the vehicle 100. For example, the nearby vehicle OB11 may be a vehicle that is preceding or following the vehicle 100.

The pedestrian OB12 may be a person located in the vicinity of the vehicle 100. The pedestrian OB12 may be a person within a preset distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a preset distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a wall.

The geographical feature may include a mountain and a hill.

In some implementations, the object may be classified as a movable object or a stationary object. For example, the movable object may include a moving nearby vehicle or a moving pedestrian. For example, the stationary object may include a traffic signal, a road, a structure, a stopped nearby vehicle, or a stopped pedestrian.

The object detection apparatus 300 may include a camera 310, a radar 320, a lidar 330, an ultrasonic sensor 340, an infrared sensor 350, and at least one processor, such as processor 370.

In some implementations, the object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 may acquire location information of an object, information on a distance to the object, and information on speed relative to the object.

For example, based on change in size over time of an object in acquired images, the camera 310 may acquire information on a distance to the object and information on speed relative to the object.

For example, the camera 310 may acquire the information on a distance to the object and the information on speed relative to the object, by using a pin hole model or profiling a road surface.

For example, the camera 310 may acquire the information on a distance to the object and the information on the speed relative to the object, based on information on disparity in stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

For example, the camera 310 may be disposed near a rear glass in the vehicle 100 in order to acquire images of the rear of the vehicle 100. Alternatively, the camera 310 may be disposed around a rear bumper, a trunk, or a tailgate.

For example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 330 may rotate by a motor and detect an object in the vicinity of the vehicle 100.

When implemented as the non-drive type lidar, the lidar 330 may utilize a light steering technique to detect an object located within a preset distance from the vehicle 100. The vehicle 100 may include a plurality of non-driving type lidars 330.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing pre-stored data with data sensed by the camera 310, the radar 320, the lidar 330, the ultrasonic sensor 340, and the infrared sensor 350.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

For example, the processor 370 may acquire information on the distance to the object or information on the speed relative to the object by using a pin hole model or by profiling a road surface.

For example, the processor 370 may acquire information on the distance to the object and information on the speed relative to the object based on information on disparity in stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In the case where the object detection apparatus 300 does not include the processor 370, the object detection apparatus 300 may operate under control of the controller 170 or at least one processor inside the vehicle 100.

The object detection apparatus 300 may operate under control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit configured to implement various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor, such as processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic volume information from the traffic system and provide the traffic volume information to the controller 170. In another example, the ITS communication unit 460 may receive a control signal from the traffic system, and provide the control signal to the controller 170 or at least one processor provided in the vehicle 100.

The processor 470 may control the overall operation of each unit of the communication apparatus 400.

In some implementations, the communication apparatus 400 may include a plurality of processors 470, or may not include the processor 470.

In the case where the communication apparatus 400 does not include the processor 470, the communication apparatus 400 may operate under control of the controller 170 or at least one processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under control of the controller 170.

The driving manipulation apparatus 500 is configured to receive a user input for driving the vehicle 100.

In the manual mode, the vehicle 100 may operate based on a signal provided by the driving manipulation apparatus 500.

The driving manipulation apparatus 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include at least one processor. Each unit of the vehicle drive apparatus 600 may include its own processor(s).

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In the case where an electric motor is the power source, the power source drive unit 611 may control the motor. The power source drive unit 611 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in the case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include at least one processor. Each unit of the vehicle dive device 600 may include its own processor(s).

The vehicle drive apparatus 600 may operate under control of the controller 170.

The vehicle travel system 700 is a system for controlling the overall driving operation of the vehicle 100. The vehicle travel system 700 may operate in the autonomous driving mode.

The vehicle travel system 700 may include the driving system 710, the parking-out system 740, and the parking system 750.

In some implementations, the vehicle travel system 700 may further include other components in addition to the aforementioned components, or may not include some of the aforementioned component.

The vehicle travel system 700 may include at least one processor. Each unit of the vehicle travel system 700 may include its own processor(s).

In some implementations, in the case where the vehicle travel system 700 is implemented as software, the vehicle travel system 700 may be implemented by at least one processor, such as the controller 170.

In some implementations, the vehicle travel system 700 may include at least one selected from among the user interface apparatus 200, the object detection apparatus 300, the communication apparatus 400, the driving manipulation apparatus 500, the vehicle drive apparatus 600, the navigation system 770, the sensing unit 120, and the controller 170.

The driving system 710 may perform driving of the vehicle 100.

The driving system 710 may perform driving of the vehicle 100 by providing a control signal to the vehicle drive apparatus 600 based on navigation information from the navigation system 770.

The driving system 710 may perform driving of the vehicle 100 by providing a control signal to the vehicle drive apparatus 600 based on information on an object received from the object detection apparatus 300.

The driving system 710 may perform driving of the vehicle 100 by providing a control signal to the vehicle drive apparatus 600 based on a signal from an external device through the communication apparatus 400.

The driving system 710 may be a system which includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs driving of the vehicle 100.

The driving system 710 may be referred to as a vehicle driving control apparatus.

The parking-out system 740 may perform an operation of pulling the vehicle 100 out of a parking space.

The parking-out system 740 may perform an operation of pulling the vehicle 100 out of a parking space, by providing a control signal to the vehicle drive apparatus 600 based on navigation information from the navigation system 770.

The parking-out system 740 may perform an operation of pulling the vehicle 100 out of a parking space, by providing a control signal to the vehicle drive apparatus 600 based on information on an object received from the object detection apparatus 300.

The parking-out system 740 may perform an operation of pulling the vehicle 100 out of a parking space, by providing a control signal to the vehicle drive apparatus 600 based on a signal received from an external device.

The parking-out system 740 may be a system which includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs an operation of pulling the vehicle 100 out of a parking space.

The parking-out system 740 may be referred to as a vehicle parking-out control apparatus.

The parking system 750 may perform an operation of parking the vehicle 100 in a parking space.

The parking system 750 may perform an operation of parking the vehicle 100 in a parking space, by providing a control signal to the vehicle drive apparatus 600 based on navigation information from the navigation system 770.

The parking system 750 may perform an operation of parking the vehicle 100 in a parking space, by providing a control signal to the vehicle drive apparatus 600 based on information on an object received from the object detection apparatus 300.

The parking system 750 may perform an operation of parking the vehicle 100 in a parking space, by providing a control signal to the vehicle drive apparatus 600 based on a signal from an external device.

The parking system 750 may be a system which includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs an operation of parking the vehicle 100.

The parking system 750 may be referred to as a vehicle parking control apparatus, an apparatus for parking a vehicle, etc.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and at least one processor. The memory may store navigation information. The processor(s) may control the operation of the navigation system 770.

In some implementations, the navigation system 770 may update pre-stored information by receiving information from an external device through the communication apparatus 400.

In some implementations, the navigation system 770 may be classified as an element of the user interface apparatus 200.

The sensing unit 120 may sense the state of the vehicle. The sensing unit 120 may include an Inertial Navigation Unit (IMU) sensor, a collision sensor, a wheel sensor, a speed sensor, a gradient sensor, a weight sensor, a heading sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, a brake pedal position sensor, etc.

In some implementations, the IMU sensor may include at least one of an accelerometer, a gyro sensor, and a magnetic sensor.

The sensing unit 120 may acquire sensing signals with regard to, for example, vehicle attitude information, vehicle motion information, vehicle yaw information, vehicle roll information, vehicle pitch information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by various sensors provided inside the vehicle 100.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
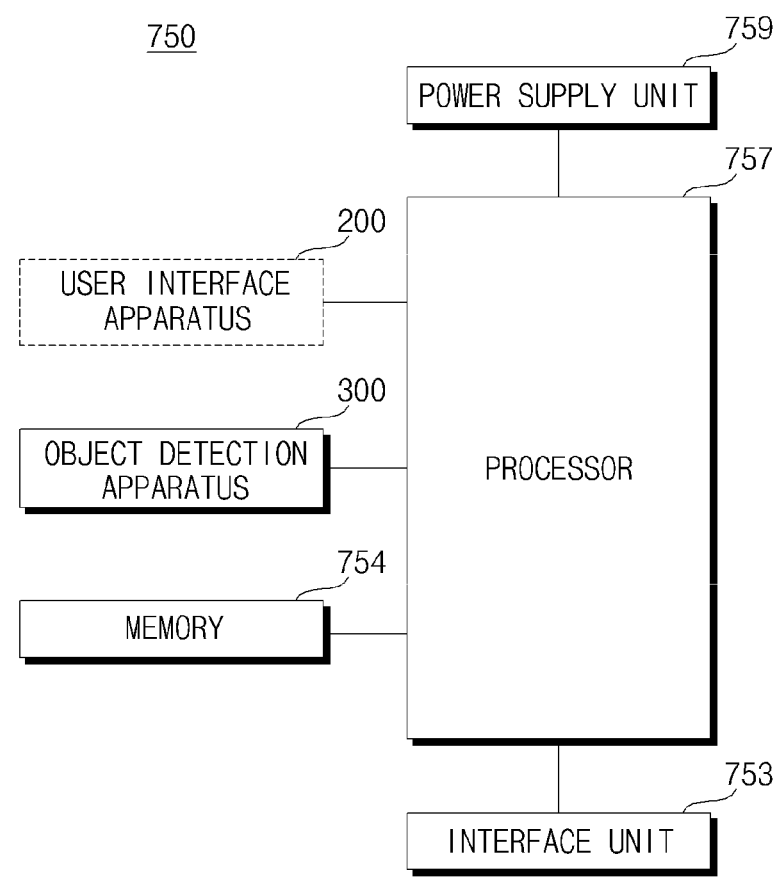
FIG. 8 is a block diagram illustrating an example of a parking system for a vehicle according to an implementation.

FIG. 8 is a block diagram illustrating a parking system for a vehicle according to an implementation.

Throughout this specification, a front-rear direction may be defined as an overall length direction L of the vehicle 100. A left-right direction may be defined as an overall width direction W of the vehicle 100. The term "overall height direction H" may be defined as an overall height direction H of the vehicle 100.

The parking system 750 may be referred to as a parking control apparatus, a parking implementation apparatus, an autonomous parking system, an autonomous parking apparatus, etc.

The parking system 750 may park the vehicle 100 in parallel to a road in a space having no parking line.

The parking system 850 may include an object detection apparatus 300, a memory 754, an interface unit 753, at least one processor such as processor 757, and a power supply unit 759.

In some implementations, the parking system 750 may further include a user interface apparatus 200.

The user interface apparatus 200 may receive a user input. The user input may be a user's input intended to park a vehicle in a parking available space.

For example, when a user touches a parking available space when the user interface apparatus 200 is displaying an image including the parking available space, the user interface apparatus 200 may receive a user input.

The user interface apparatus 200 may transmit, to the processor 757, a signal corresponding to the received user input.

Description about the user interface apparatus 200 explained above with reference to FIGS. 1 to 7 may be applied to the user interface apparatus 200 shown in FIG. 8.

The object detection apparatus 300 may generate information about an object located outside a vehicle.

The object detection apparatus 300 may generate information about at least one vehicle which is already parked.

The nearby vehicles may be parallel parked.

The object detection apparatus 300 may sense a nearby vehicle and generate information about the nearby vehicle.

For example, the object detection apparatus 300 may generate information about a first nearby vehicle which is already parked.

For example, the object detection apparatus 300 may generate first information about a first nearby vehicle being already parked, and second information about a second nearby vehicle being already parked.

The object detection apparatus 300 may provide information about a nearby vehicle to the processor 757.

In some implementations, a nearby vehicle may be a vehicle parallel-parked in a space in which the vehicle 100 is going to be parked.

The vehicle 100 may be parallel-parked in the front side or the rear side of the nearby vehicle.

The parking system 750 may provide a control signal so that the vehicle 100 is parallel-parked in the front side or rear side of the nearby vehicle.

The object detection apparatus 300 may generate information a structure that is close to a virtual reference line. The virtual reference line will be described later.

The structure may include a curb or a wall.

The object detection apparatus 300 may generate information about a curb in the surroundings of a nearby vehicle.

The object detection apparatus 300 may generate information about a wall in the surroundings of a nearby vehicle.

The object detection apparatus 300 may transmit generated information about a parking space to the processor 757.

Description about the object detection apparatus 300 explained above with reference to FIGS. 1 to 8 may be applied to the object detection apparatus 300 shown in FIG. 8.

The memory 754 may store various types of data, such as programs for processing or controlling the processor 757, which are required for overall operation of the parking system 750. The memory may be any of various hardware storage devices, such as ROMs, RAMs, EPROMs, flash drives, hard drives, etc.

The memory 756 may be a volatile memory. For example, the memory 756 may be an SRAM.

The memory 754 may be integrally formed with the processor 757 or may be separate from the processor 757.

The interface unit 753 may act as a channel to exchange data with other devices inside the vehicle 100.

The interface unit 753 may receive data from an electrically connected unit, and transmit signal processed or generated by the processor to an electrically connected unit.

The interface unit 753 may transmit received information, data, or signal to the processor 757. The interface unit 753 may transmit information, data, or a signal generated or processed by the processor 757 to a different device included in the vehicle 100.

In particular, the interface unit 753 may exchange data with the vehicle drive apparatus 600 and the sensing unit 120.

The processor 757 may control overall operation of each unit included in the parking system 750.

The processor 757 may be implemented by using at least one of may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The processor 757 may receive information about an object from the object detection apparatus 300.

For example, the processor 757 may receive information about a nearby vehicle and a structure from the object detection apparatus 300.

In some implementations, information about an object may be information based on data acquired by one or more of the camera 310, the radar 320, the lidar 330, the ultrasonic sensor 340, and the infrared sensor 350.

For example, information about an object may be based on information about an image of the surroundings of a vehicle, which is acquired by the camera 310.

In some implementations, the processor 757 may set an edge point of a nearby parked vehicle based on information about the nearby parked vehicle.

An edge point of a nearby parked vehicle may be defined as a point or an edge where a plurality of faces defining the body of the nearby vehicle meet one another. For example, an edge point may be defined as the convergence of any three surfaces of the nearby parked vehicle.

The edge point may be defined based on a top view as one of the four corners of the nearby parked vehicle. As seen from the top, the edge point may be each vertex defining the outer body of the nearby vehicle.

For example, the edge point may be one point in a front bumper, which is formed as a left side face and the front side face of the nearby vehicle meet each other. As another example, the edge point may be one point in a rear bumper, which is formed as a left side face and a rear side face of the nearby vehicle meet each other.

As another example, the edge point may be one point in a front bumper, which is formed as a right side face and a front side face of the nearby vehicle meet each other. As yet another example, the edge point may be one point in a rear bumper, which is formed as a left side face and a rear side face of the nearby vehicle meet each other.

As such, by establishing an edge point of the nearby parked vehicle, the automated parking system of the vehicle to be parked may determine a reference point for the parking operation.

The processor 757 may set an edge point by comparing a travelling trajectory of the vehicle 100 and a position of the nearby vehicle during sensing of a parking available space.

The processor 757 may set an edge point by comparing an angle of orientation, or a heading angle, of the vehicle and a position of the nearby vehicle during sensing of a parking available space.

For example, the processor 757 may set a portion, which is farthest in a left-right direction from the vehicle 100 on an exterior side face of a nearby vehicle close to the vehicle 100 during sensing of a parking available space, as an edge point.

For example, the processor 757 may set a farthest portion from the vehicle 100 in the left-right direction within a preset distance range as an edge point.

During sensing of a parking available space, the vehicle 100 may travel straight forward at a constant speed.

During sensing of a parking available space, the object detection apparatus 300 may detect a nearby vehicle being parked in the vicinity, and generate information about the nearby vehicle.

During sensing of a parking available space, the processor 757 may set an edge point and a virtual reference line and generate predicted position information based on information about a nearby vehicle.

The processor 757 may set a virtual reference line based on an edge point.

The virtual reference line may be defined as a line with reference to which a vehicle is able to be parallel parked in a space having no parking line.

The virtual reference line may play a role of a parking line in a longitudinal direction, by which a parking space can be distinguished.

The processor 757 may provide a control signal so that the vehicle 100 is parallel parked with the body thereof having passed the virtual reference line.

The processor 757 may provide a control signal to the vehicle drive apparatus 600 through the interface unit 753.

Based on a virtual reference line and a direction of orientation, or a heading direction, that the vehicle 100 will head after completion of parking, the processor 757 may generate predicted position information. The predicted position information may include information about a predicted position of the vehicle 100 upon completion of parking.

The processor 757 may provide a control signal so that the vehicle 100 is parallel parked based on predicted position information.

For example, the processor 757 may generate predicted position information so that the vehicle 100, when parked, has a heading angle of a small value (which is, for example, between −10 degrees to +10 degrees) with reference to a virtual reference line.

For example, the processor 757 may generate predicted position information so that the vehicle 100, when parked, has a heading angle of 0 degree with reference to a virtual reference line.

For example, the processor 757 may generate predicted position information so that a portion closest to a structure in the body of the vehicle 100 is a preset distance or more from the structure.

Based on information about a curb and a direction which the vehicle 100 will head upon completion of parking, the processor 757 may generate predicted position information that is information about a predicted position of the vehicle 100 upon completion of parking.

The processor 757 may provide a control signal so that the vehicle 100 is completely parked based on the predicted position information.

For example, the processor 757 may generate predicted position information so that the vehicle 100, when parked, has a heading angle of a small value (which is, for example, between −10 degrees to +10 degrees) with reference to a line which defines a longitudinal edge of a curb.

For example, the processor 757 may generate predicted position information so that the vehicle 100, when parked, has a heading angle of 0 degree with reference to a line which defines a longitudinal edge of a curb.

The processor 757 may receive information about a first nearby vehicle which is already parked.

The processor 757 may set a portion, which is farthest in a left-right direction from the vehicle 100 on an exterior side face of the first nearby vehicle being close to the vehicle 100 during sensing of a parking available space, as an edge point.

The processor 757 may set a line extending from the edge point in a front-rear direction as a virtual reference line.

For example, the processor 757 may set a line, which extends from the edge point in a front-rear direction along a heading direction of the vehicle 100 during sensing of a parking available space, as a virtual line.

The processor 757 may provide a control signal so that the vehicle 100 is parallel parked in the front side or rear side of the first nearby vehicle.

The processor 757 may receive first information about the first vehicle being already parked, and second information about a second nearby vehicle being already parked.

The processor 757 may provide a control signal so that the vehicle 100 is parallel parked in a space between the first and second nearby vehicles.

The processor 757 may set a first edge point based on the first information. The processor 757 may set a first reference line based on the first edge point.

For example, the processor 757 may set a line, which extends from the first edge point in a front-rear direction along a heading direction of the vehicle 100 during sensing of a parking available space, as a first reference line.

The processor 757 may set a second edge point based on the second information. The processor 757 may set a second reference line based on the second edge point.

For example, the processor 757 may set a line, which extends from the second edge point in a front-rear direction along a heading direction of the vehicle 100 during sensing of a parking available space, as a second reference line.

The processor 757 may provide a control signal so that the vehicle 100 is parallel parked in a space between the first and second nearby vehicles based on the first reference line and the second reference line.

The first reference line may be parallel to or coincide with the second reference line.

The processor 757 may determine whether the first and second reference lines coincide with each other.

When it is determined that the first and second reference lines coincide with each other, the processor 757 may provide a control signal so that the vehicle 100 is parallel parked with the body thereof having passed the first reference line.

When it is determined that the first and second reference lines do not coincide with each other, the processor 757 may set a third reference line positioned in the middle between the first and second reference lines.

The processor 757 may provide a control signal so that the vehicle 100 is parallel parked with the body thereof having passed the third reference line.

The processor 757 may determine whether one vehicle is allowed to be parked in a space between the first and second nearby vehicles.

When it is determined that one vehicle is allowed to be parked in the space between the first and second nearby vehicles, the processor 757 may provide a control signal so that the vehicle 100 is parallel parked in the middle between the first and second nearby vehicles.

The processor 757 may determine whether two or more vehicles are allowed to be parked in the space between the first and the second vehicles.

When it is determined that two or more vehicles are allowed to be parked in the space between the first and second nearby vehicles, the processor 757 may provide a control signal so that the vehicle 100 is parallel parked closer to the first nearby vehicle than the second nearby vehicle.

The processor 757 may receive information about a curb in the surroundings of a nearby vehicle.

The processor 757 may provide a control signal so that the vehicle 100 is parallel parked within a first distance range from the curb.

The processor 757 may receive information as to whether there is a person sitting in the passenger seat.

For example, the processor 757 may receive, from the internal camera 220 of the user interface apparatus 200, the information as to whether there is a person sitting in the passenger seat.

For example, the processor 757 may receive, from an occupant detection sensor provided in the passenger seat, whether there is a person sitting in the passenger seat. The processor 757 may adjust the first distance range based on the information as to whether there is a person sitting in the passenger seat.

The processor 757 may receive information about a wall in the surroundings of a nearby vehicle.

The processor 757 may provide a control signal so that the vehicle 100 is parallel parked within a second distance range from the wall.

The second distance range may be different from the first distance range.

The processor 757 may receive information as to whether there is a person sitting in the passenger seat.

The processor 757 may adjust the second distance range based on the information as to whether there is a person sitting in the passenger seat.

The power supply unit 759 may supply power necessary to operate each unit under the control of the processor 757. In particular, the power supply unit 759 may be supplied with power from a battery inside the vehicle 100.

Figure 9:
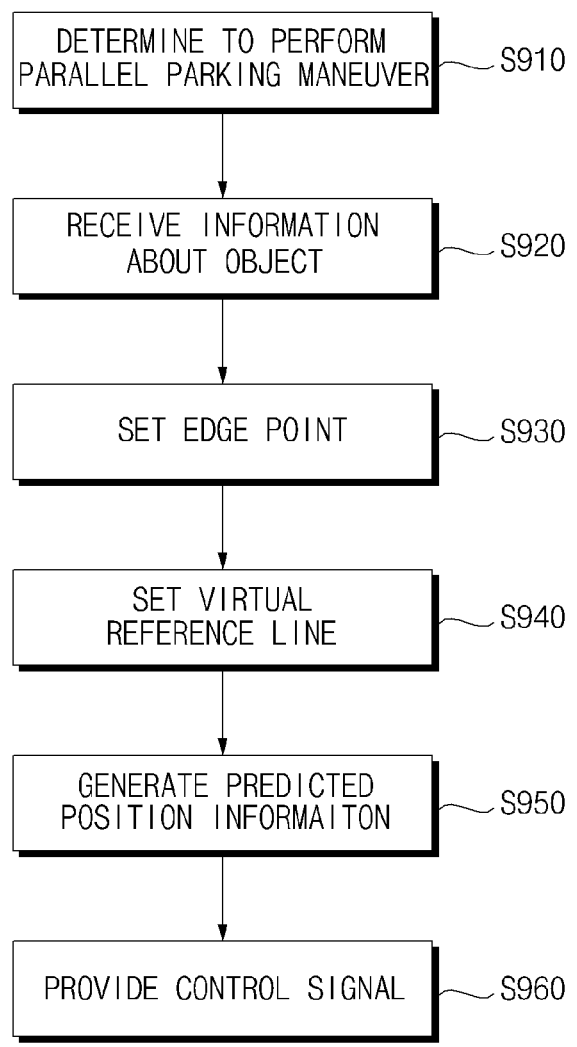
FIG. 9 is a flowchart illustrating an example of an operation of a parking system for a vehicle according to an implementation.

FIG. 9 is a flowchart illustrating operation of a parking system for a vehicle according to an implementation.

Referring to FIG. 9, the processor 757 may determine to perform a parallel parking maneuver in S910.

For example, the processor 757 may determine, based on a user input received through the user interface apparatus 200, to perform a parallel parking maneuver.

For example, the processor 757 may determine, based on information generated by the object detection apparatus 300, to perform a parallel parking maneuver.

For example, the processor 757 may determine, based on a signal received from an external device through the communication apparatus 400, to perform a parallel parking maneuver.

The processor 757 may receive information about an object from the object detection apparatus 300 in S920.

The information about an object may include information about a nearby parked vehicle, and information about a structure located in the surroundings of the nearby vehicle.

The processor 717 may set an edge point of the nearby vehicle based on information about a nearby vehicle in S930.

The processor 757 may set a virtual reference line based on the set edge point in S940.

The processor 757 may generate predicted position information in S950.

For example, the processor 757 may generate predicted position information based on a virtual reference line and a heading angle of the vehicle 100.

For example, the processor 757 may generate predicted position information based on information about a curb in the surroundings of a nearby vehicle and a heading angle of the vehicle 100.

The processor 757 may provide a control signal so that the vehicle 100 is parallel parked with the body thereof having passed the reference line in S960.

The processor 757 may provide a control signal so that the vehicle 100 is parallel parked based on the predicted position information.

Figure 10:
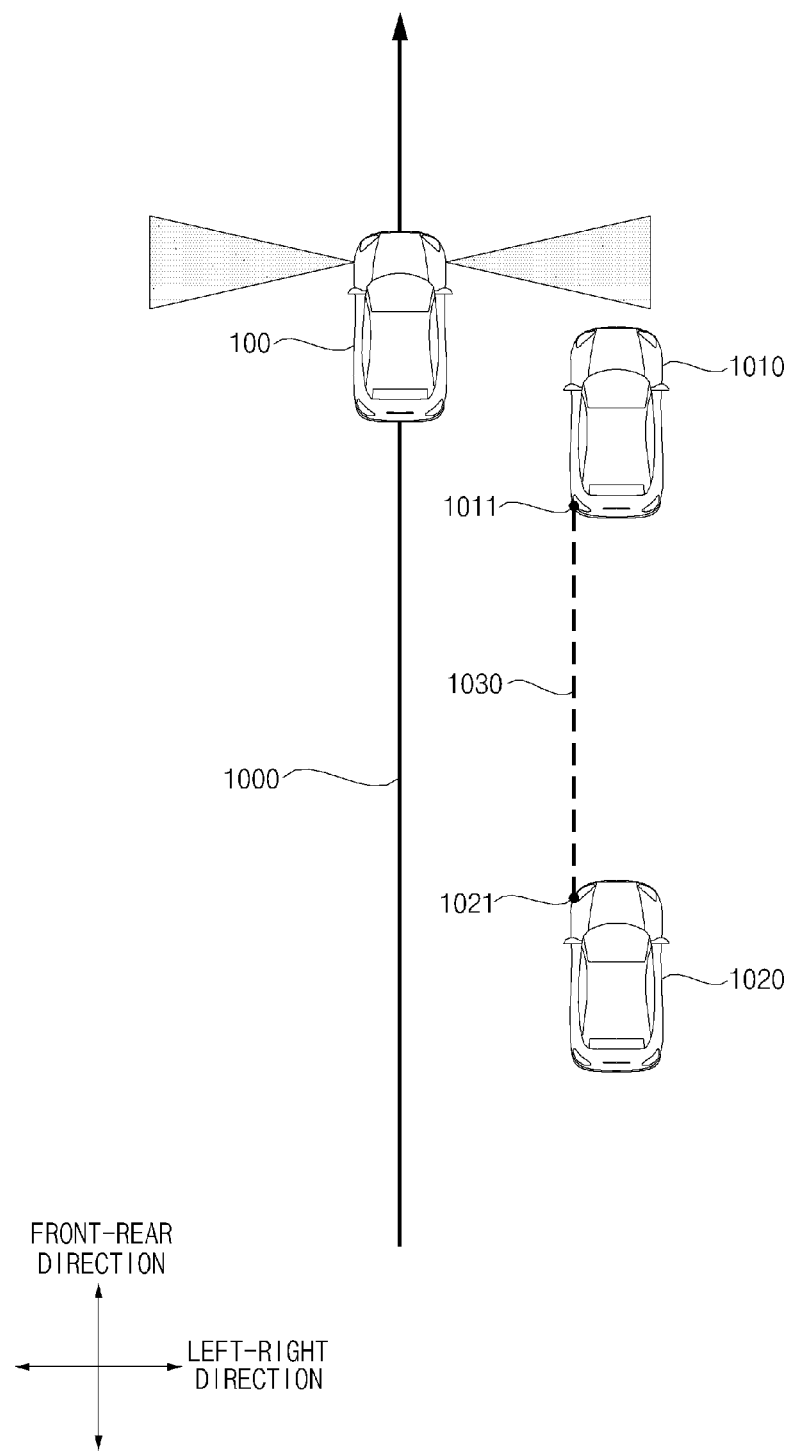
FIG. 10 is a diagram illustrating an example of an operation of a parking system according to an implementation.

FIG. 10 is a diagram illustrating operation of a parking system according to an implementation.

Referring to FIG. 10, the parking system 750 may perform a parallel parking maneuver in a space having no parking line.

The vehicle 100 may travel straight forward to sense a parking available space.

In this case, steering of the vehicle 100 is not performed.

During sensing of a parking available space, a travelling trajectory 1000 of the vehicle 100 forms a straight line.

The travelling trajectory 1000 formed during sensing of a parking available space for the vehicle 100 may be used as a reference to set an edge point of a nearby vehicle, to set a virtual reference line, or to set a predicted position of the vehicle 100 upon completion of parking.

In some implementations, the travelling trajectory 1000 may be defined as a heading angle of the vehicle 100 during sensing of a parking available space.

During sensing of a parking available space, the object detection apparatus 300 may detect nearby vehicles 1010 and 1020 which are already parked.

The object detection apparatus 300 may generate information about the nearby vehicles 1010 and 1020.

The object detection apparatus 300 may provide the information about the nearby vehicles 1010 and 1020 to the processor 757.

The processor 757 may receive the information about the nearby vehicles 1010 and 1020 from the object detection apparatus 300.

The processor 757 may set edge points 1011 and 1021 of the nearby vehicles 1010 and 1020 based on the information about the nearby vehicles 1010 and 1020.

The processor 757 may set one or more edge points 1011 and 1021 for each of the nearby vehicles 1010 and 1020.

The processor 757 may set a virtual reference line 1030 based on the edge points 1011 and 1021.

The processor 757 may perform a parallel parking maneuver based on the virtual reference line 1030.

For example, the processor 757 may provide a control signal so that the vehicle 100 is parallel parked with the body thereof having passed the virtual reference line 1030.

For example, the processor 757 may provide a control signal so that the vehicle 100 is parallel parked with a plurality of wheels thereof having passed the virtual line 1030.

The processor 757 may provide a control signal to the vehicle drive apparatus 600 though the interface unit 753.

The processor 757 may provide a control signal so that the vehicle 100 is parallel parked with a first distance or more from the nearby vehicle 1010 positioned in front of the vehicle 100.

The first distance may be a distance necessary to exit the vehicle 100 without reverse.

In some implementations, after the vehicle 100 is parked, the processor 757 may perform a moving parking maneuver based on information about a change in circumstances.

For example, in the case where the vehicle 100 is parked and where another vehicle is parked at a distance smaller than the first distance after the nearby vehicle 1010 in front of the vehicle 100 exits, the processor 757 may perform a moving parking maneuver such that the vehicle 100 travels rearward and is then parked again in order to maintain the first distance.

In doing so, it is possible to secure a space to exit the vehicle 100 even when there is a change in circumstances.

Figure 11:
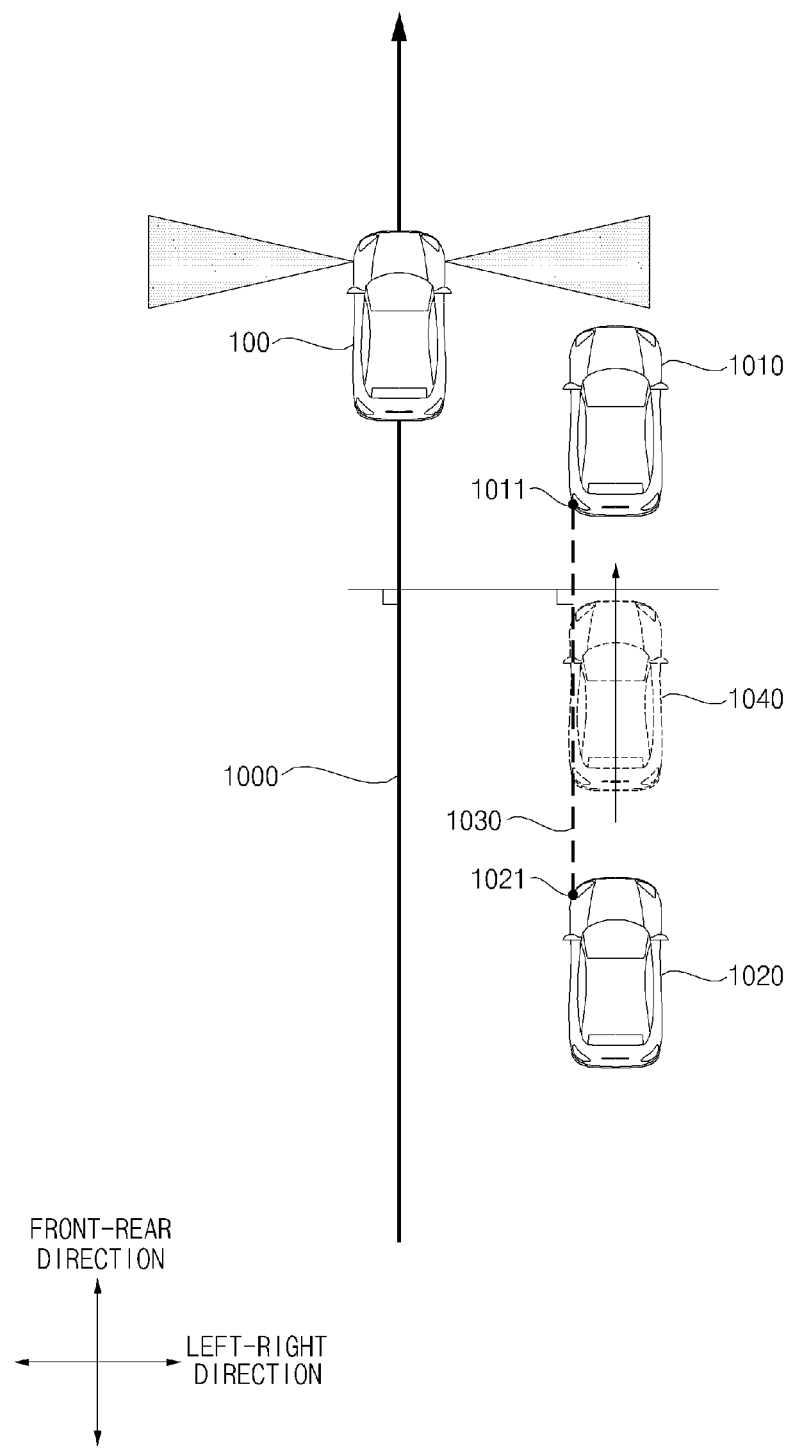
FIGS. 11 to 13 are diagrams illustrating examples of generating information about a predicted position of a vehicle upon completion of parking, according to an implementation.
Figure 12:
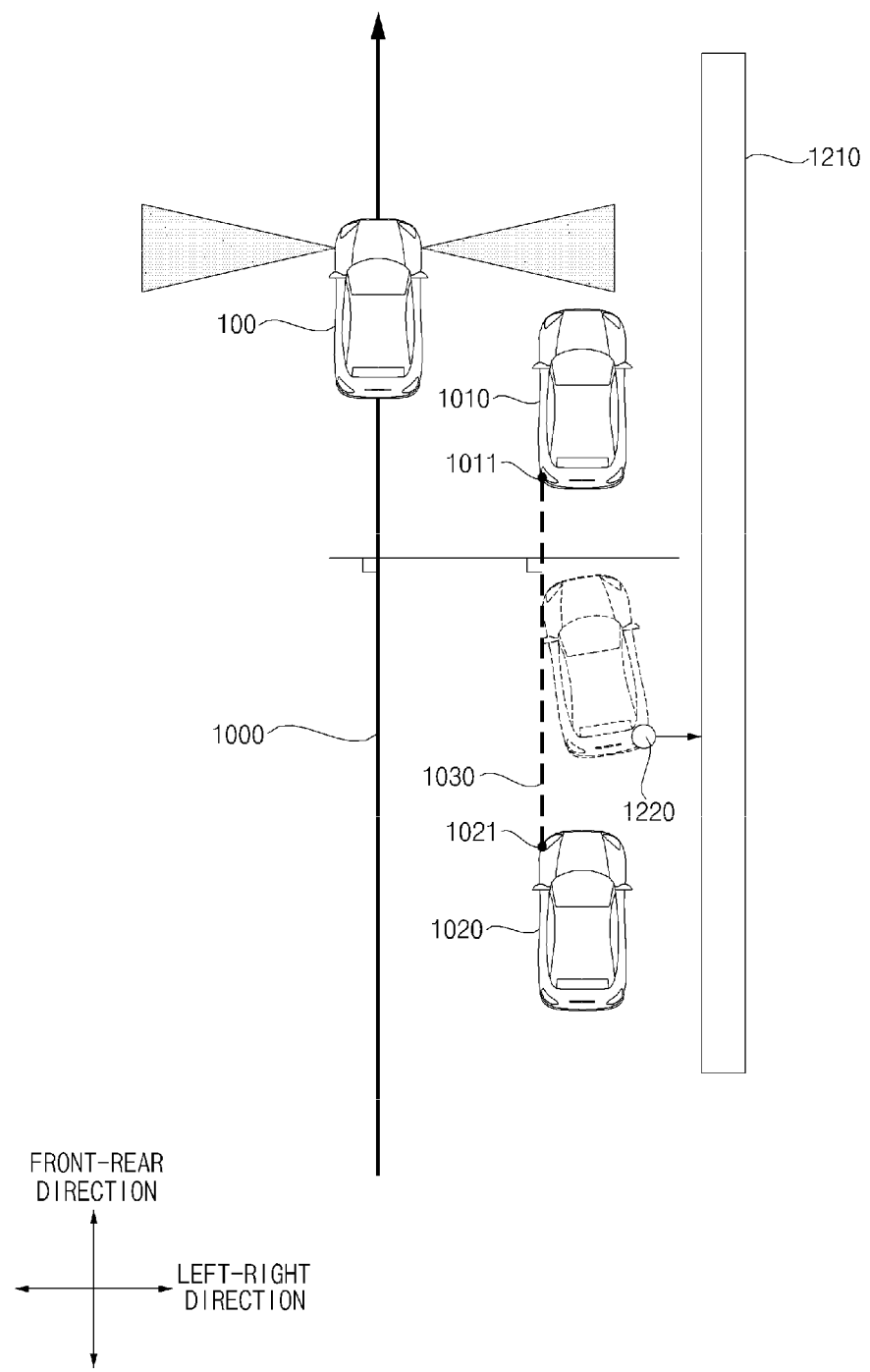
Figure 13:
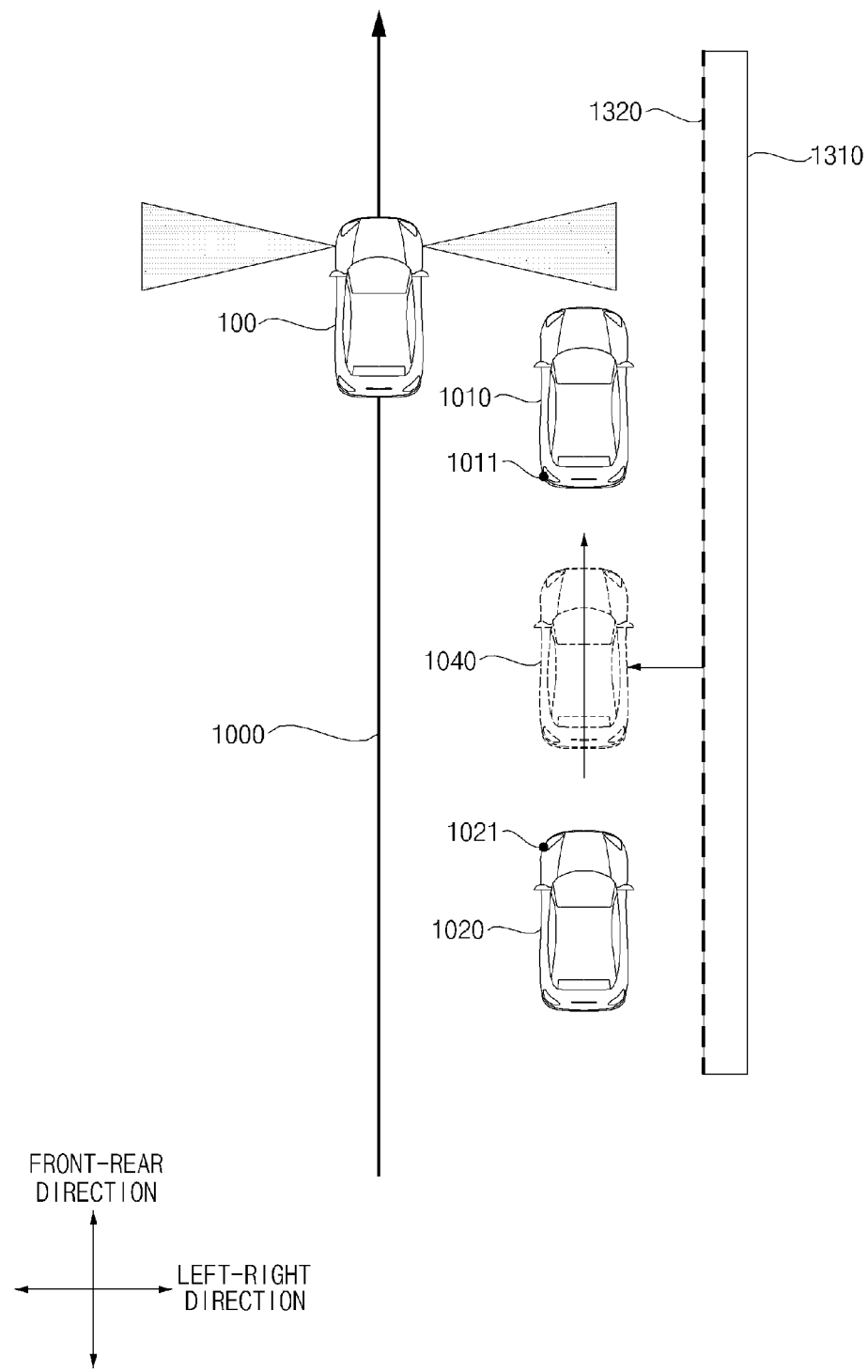

FIGS. 11 to 13 are diagrams illustrating how to generate information about a predicted position of a vehicle upon completion of parking, according to an implementation.

Referring to FIG. 11, based on a virtual reference line 1030 and a heading direction 1040 which the vehicle 100 will head upon completion of parking, the processor 757 may generate predicted position information that is information about a predicted position of the vehicle 100 upon completion of parking.

For example, the processor 757 may generate predicted position information so that the vehicle 100, when parked, has a heading angle of between −7 degrees and +7 degrees with reference to the virtual reference line 1030.

In doing so, it is possible to park the vehicle in parallel with nearby vehicles 1010 and 1020 and to prevent damage to the vehicle 100 by other vehicles travelling in the surroundings of the vehicle 100.

The processor 757 may provide a control signal so that the vehicle 100 is parallel parked based on the predicted position information.

Referring to FIG. 12, the processor 757 may generate predicted position information so that a portion 1220 closest to a structure 1210 in the body of the vehicle 100 is a preset distance or more from the structure 1210 upon completion of parking.

The structure 1210 may be a street light, a street tree, a light, a pole, a bus stand, a curb, or a wall.

In doing so, when performing a parking maneuver, it is possible to prevent collision between the vehicle 100 and the structure 1210 and to secure a space for a passenger to get off.

Referring to FIG. 13, the processor 757 may receive information about a curb 1310 in the surroundings of nearby vehicles 1010 and 1020.

Based on the information about the curb 1310 and a heading direction 1040 which the vehicle 100 will head upon completion of parking, the processor 757 may generate predicted position information that is information about a predicted position of the vehicle 100 upon completion of parking.

For example, the processor 757 may generate predicted position information so that the vehicle 100, when parked, has a heading angle of between −7 degrees and +7 degrees with reference to a line 1320 defining a longitudinal edge of the curb 1310.

In doing so, it is possible to park the vehicle 100 in parallel with the nearby vehicles 1010 and 1020, and to prevent damage to the vehicle 100 by other vehicles travelling in the surroundings of the vehicle 100.

Figure 14:
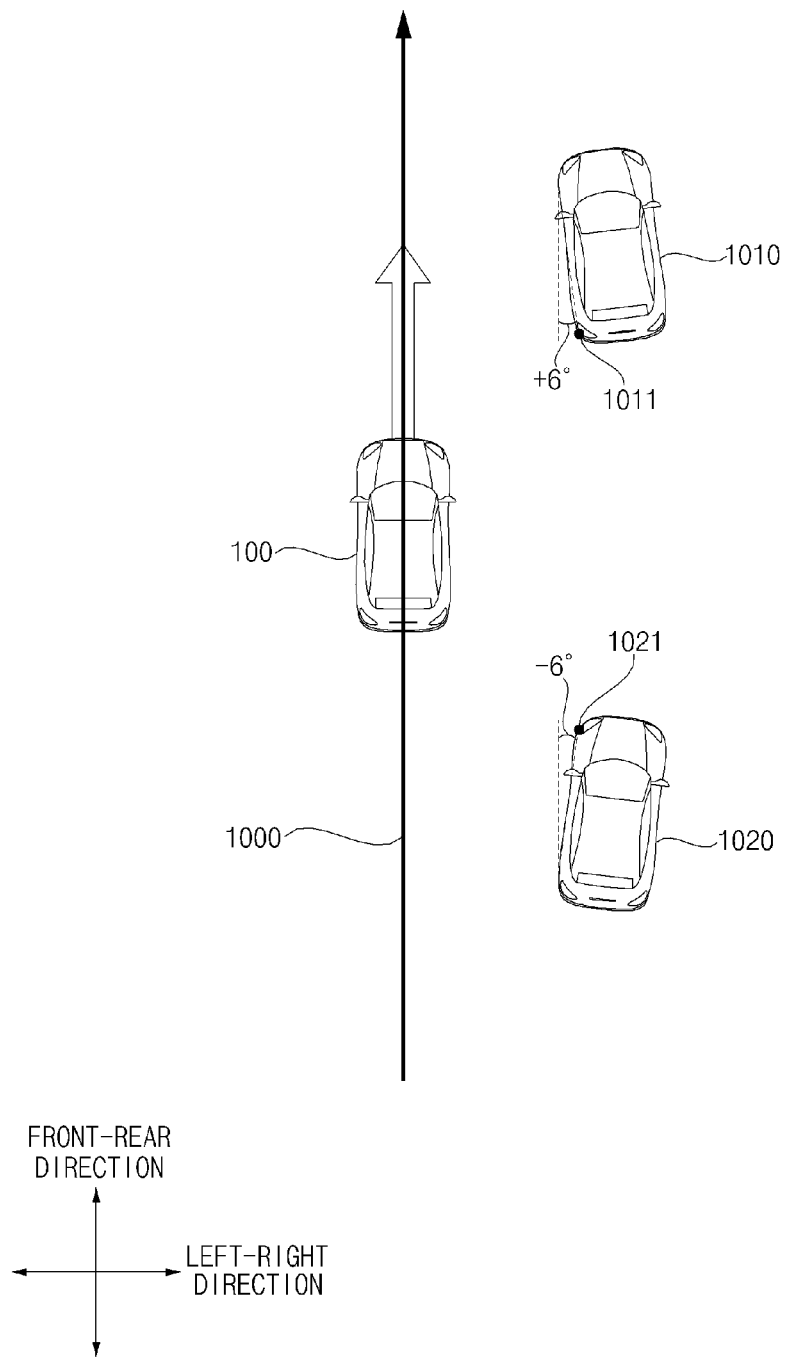
FIGS. 14 and 15 are diagrams illustrating examples of setting an edge point according to an implementation.
Figure 15:
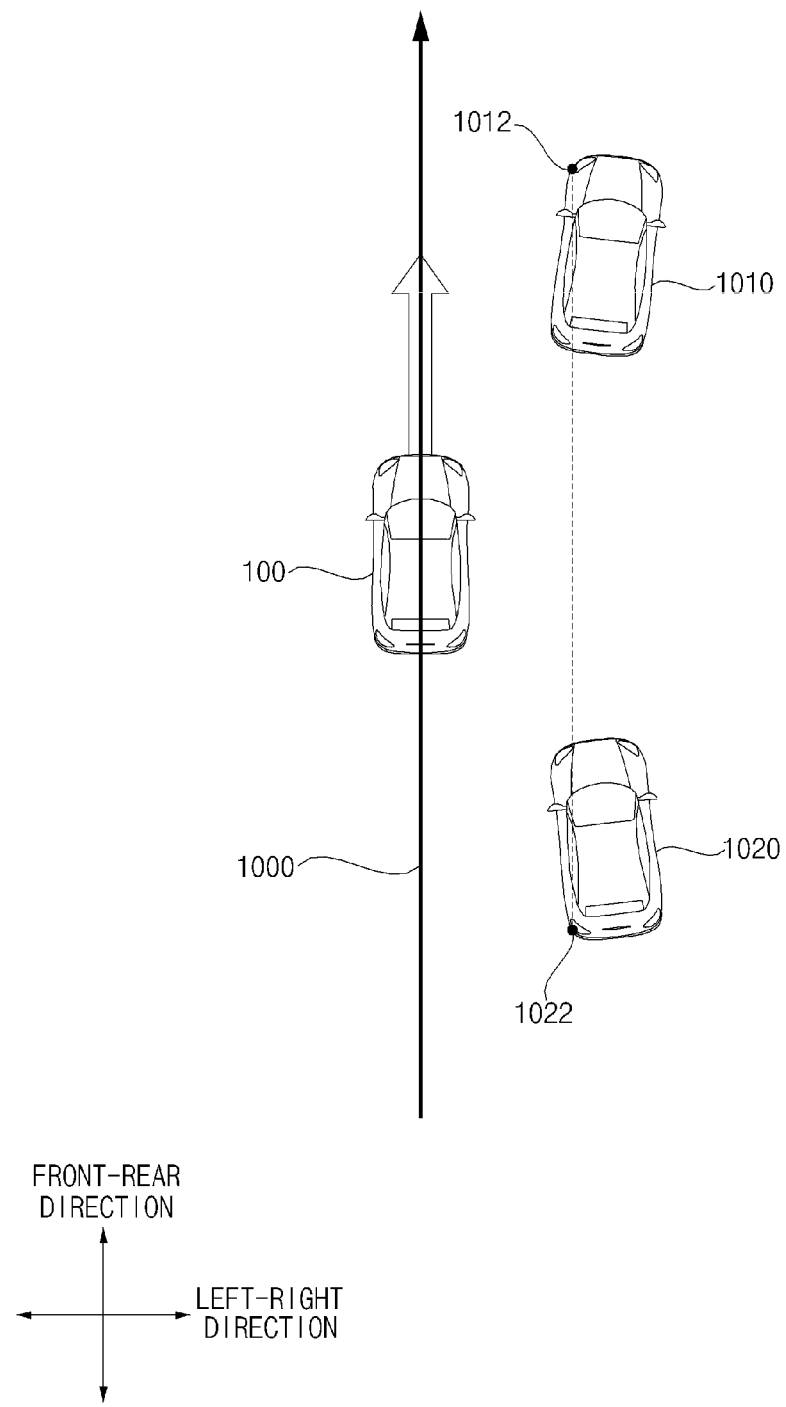

FIGS. 14 and 15 are diagrams illustrating how to set an edge point according to an implementation.

With reference to FIGS. 14 and 15, a position of a nearby vehicle 1010 or 1020 as seen from the top (with reference to a top view thereof) will be described in detail.

Referring to the drawings, the processor 757 may set an edge point 1011 or 1021 of the nearby parked vehicle 1010 or 1020 by comparing a travelling trajectory 1000 of the vehicle 100 and a position of the nearby vehicle 1010 or 1020 during sensing of a parking available space.

In some implementations, the processor 757 may set an edge point 1011 or 1021 as a portion, which is farthest from the vehicle 100 in a left-right direction on an exterior side face of the nearby vehicle 1010 or 1020 that is closest to the vehicle 100.

As a more detailed example, the processor 757 may establish edge points 1011 or 1021 by first determining an exterior side face of the nearby vehicle 1010 or 1020 that is closest to the vehicle 100. In FIGS. 14 and 15, that exterior side face is the left-hand exterior side face of the nearby parked vehicles 1010 and 1020. Then, the processor 757 may determine a portion of that exterior side face that is farthest from the vehicle 100 in a left-right direction.

As illustrated in FIG. 14, when a first nearby vehicle 1010 is parked while being tilted leftward from the travelling trajectory 1000 of the vehicle 100 during sensing of the parking available space, the processor 757 may set a portion 1011, which is formed as the left side face and a rear face of the first nearby vehicle 1010 meet, as an edge point.

The first nearby vehicle 1010 is a vehicle that is positioned in the front side of the vehicle 100 upon completion of parking.

When a second nearby vehicle 1020 is parked while being tilted rightward from the travelling trajectory 1000 of the vehicle 100 during sensing of a parking available space, the processor 757 may set a portion 1021, which is formed as the left side face and the rear face of the second nearby vehicle 1020 meet, as an edge point.

The second nearby vehicle 1010 is a vehicle that is positioned in the rear side of the vehicle 100 upon completion of parking.

As illustrated in FIG. 15, when the first nearby vehicle 1010 is parked while being tilted rightward from the travelling trajectory 1000 of the vehicle 100 during sensing of a parking available space, the processor 757 may set a portion, which is formed as the left side face and the front face of the first nearby vehicle 1010 meet, as an edge point.

The first nearby vehicle 1010 is a vehicle that is positioned in the front side of the vehicle 100 upon completion of parking.

When the second nearby vehicle 1020 is parked while being tilted leftward from the travelling trajectory 1000 of the vehicle 100 during sensing of a parking available space, the processor 757 may set a portion 1022, where the left side face and the rear face of the second nearby vehicle 1020 meet each other, as an edge point.

The second nearby vehicle 1010 is a vehicle that is positioned in the rear side of the vehicle 100 upon completion of parking.

Figure 16:
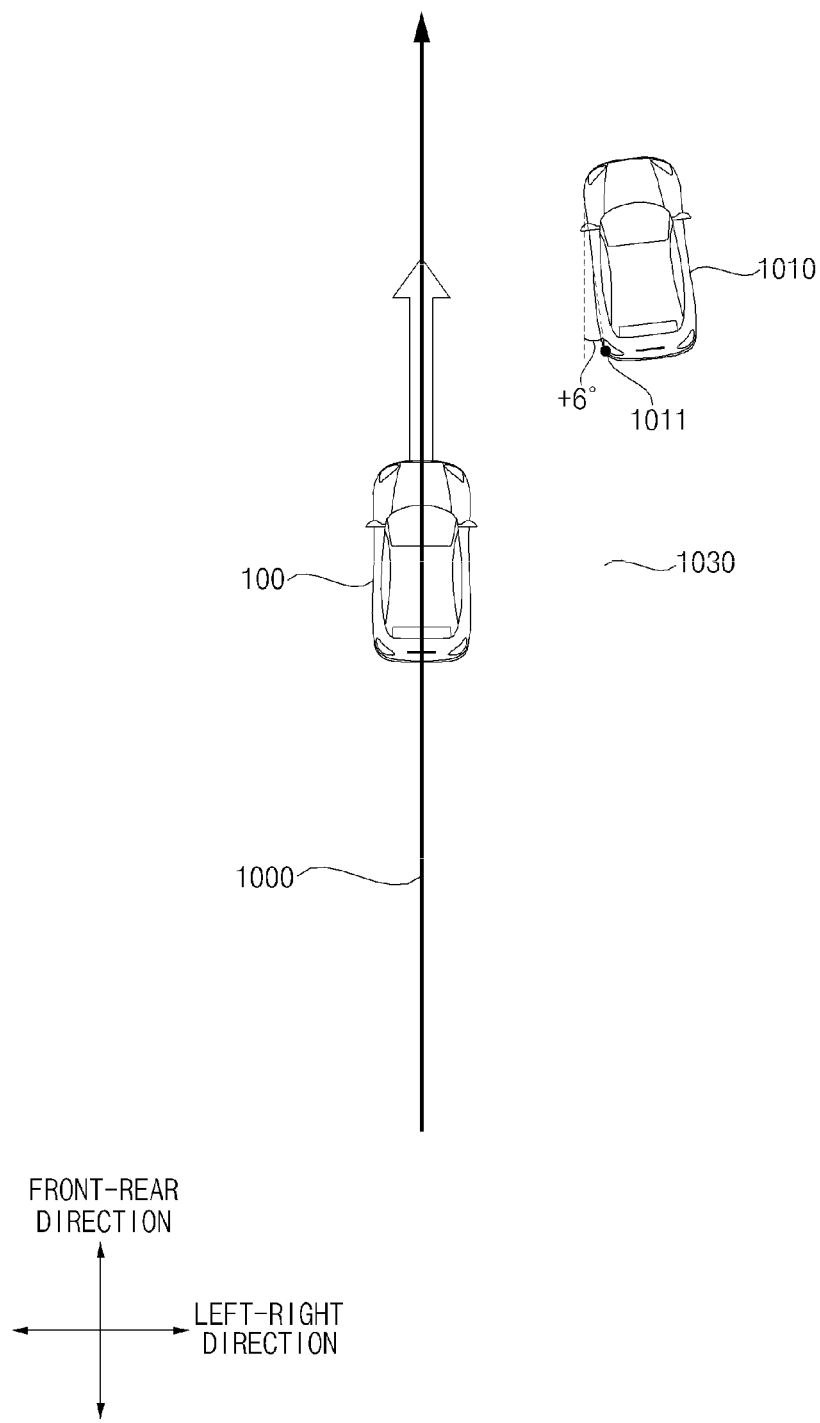
FIG. 16 is a diagram illustrating an example of an operation of a parking system in a scenario in which there is only one nearby vehicle, according to an implementation.

FIG. 16 is a diagram illustrating operation of a parking system when there is only one nearby vehicle, according to an implementation.

Referring to FIG. 16, the object detection apparatus 300 may generate information about a first nearby vehicle 1010.

Based on the information about the first nearby vehicle 1010, the processor 757 may set a portion 1011, which is farthest in a left-right direction from the vehicle 100 on an exterior side face of the first nearby vehicle 1010 close to the vehicle 100 during sensing of a parking available vehicle, as an edge point.

The processor 757 may set a line 1030 extending in a front-rear direction from the edge point 1011 as a virtual reference line.

For example, the processor 757 may set a line, which extends from the edge point 1011 in the front-rear direction along a heading direction 1000 of the vehicle 100 during sensing of a parking available space, as a virtual reference line.

The processor 757 may provide a control signal so that the vehicle 100 is parallel parked in the front side or the rear side of the first nearby vehicle 1010.

In this case, the processor 757 may provide a control signal so that the vehicle 100 is parallel parked with a first distance or more from the first nearby vehicle 1010.

The first distance is a distance required to secure a space to exit the vehicle 100 without reverse.

FIGS. 17 to 20 are diagrams illustrating operation of a parking system when there are two nearby vehicles, according to an implementation.

Figure 17:
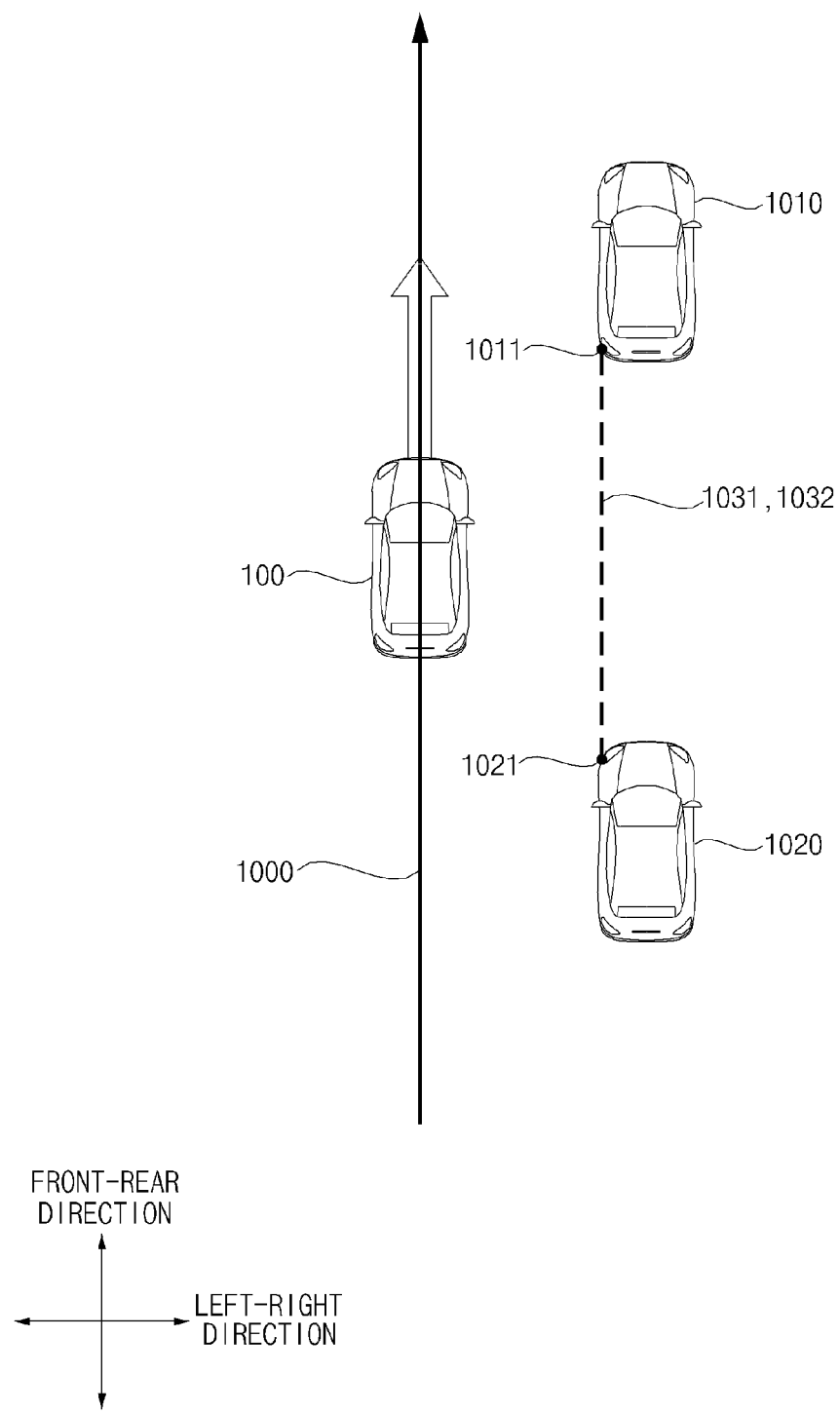
FIGS. 17 to 20 are diagrams illustrating examples of operations of a parking system in a scenario in which there are two nearby vehicles, according to an implementation.

Referring to FIG. 17, the object detection apparatus 300 may generate first information about a first nearby vehicle 1010 and second information about a second nearby vehicle 1020.

The first nearby vehicle 1010 is a vehicle that is positioned in the front side of the vehicle 100 upon completion of parking.

The second nearby vehicle 1020 is a vehicle that is positioned in the rear side of the vehicle 100 upon completion of parking.

Based on the first information, the processor 757 may set a portion 1011, which is the farthest in a left-right direction from the vehicle 100 on a side face of the first nearby vehicle 1010 being close to the vehicle 100 during sensing of a parking available space, as a first edge point.

The processor 757 may set a line 1031 extending in a front-rear direction from the first edge point 1011 as a first reference line.

For example, the processor 757 may set a line, which extends from the first edge point 1011 in the front-rear direction along a heading direction 1000 of the vehicle 100 during sensing of a parking available space, as a first reference line 1031.

The processor 757 may set a portion 1021, which is farthest in a left-right direction from the vehicle 100 on an exterior side face of the second nearby vehicle 1020 being close to the vehicle 100 during sensing of a parking available space, as a second edge point.

The processor 757 may set a line 1032 extending in a front-rear direction from the second edge point 1021 as a second reference line.

For example, the processor 757 may set a line, which extends from the second edge point 1021 in the front-rear direction along a heading direction 1000 of the vehicle 100 during sensing of a parking available space, as a second reference line 1032.

The processor 757 may provide a control signal to allow the vehicle 100 to be parallel parked in a space between the first nearby vehicle 1010 and the second nearby vehicle 1020.

In this case, the processor 757 may provide a control signal so that the vehicle 100 is parallel parked with a first distance or more from the first nearby vehicle 1010.

The first distance is a distance required to secure a space to exit the vehicle 100 without reverse.

Alternatively, the processor 757 may provide a control signal so that the vehicle 100 is parallel parked with a second distance or more from the second nearby vehicle 1020.

The second distance is a distance required to secure a space to exit the second nearby vehicle 1020 without reverse.

In some implementations, the first reference line 1031 may be in parallel with the second reference line 1032 or may coincide with the second reference line 1032.

The processor 757 may determine a distance between the first reference line 1031 and the second reference line 1032.

As illustrated in FIG. 17, when it is determined that the distance between the first reference line 1031 and the second reference line 1032 falls within a preset range, the processor 757 may provide a control signal so that the vehicle 100 is parallel parked with the body thereof having passed the first reference line 1031 or the second reference line 1032.

Figure 18:
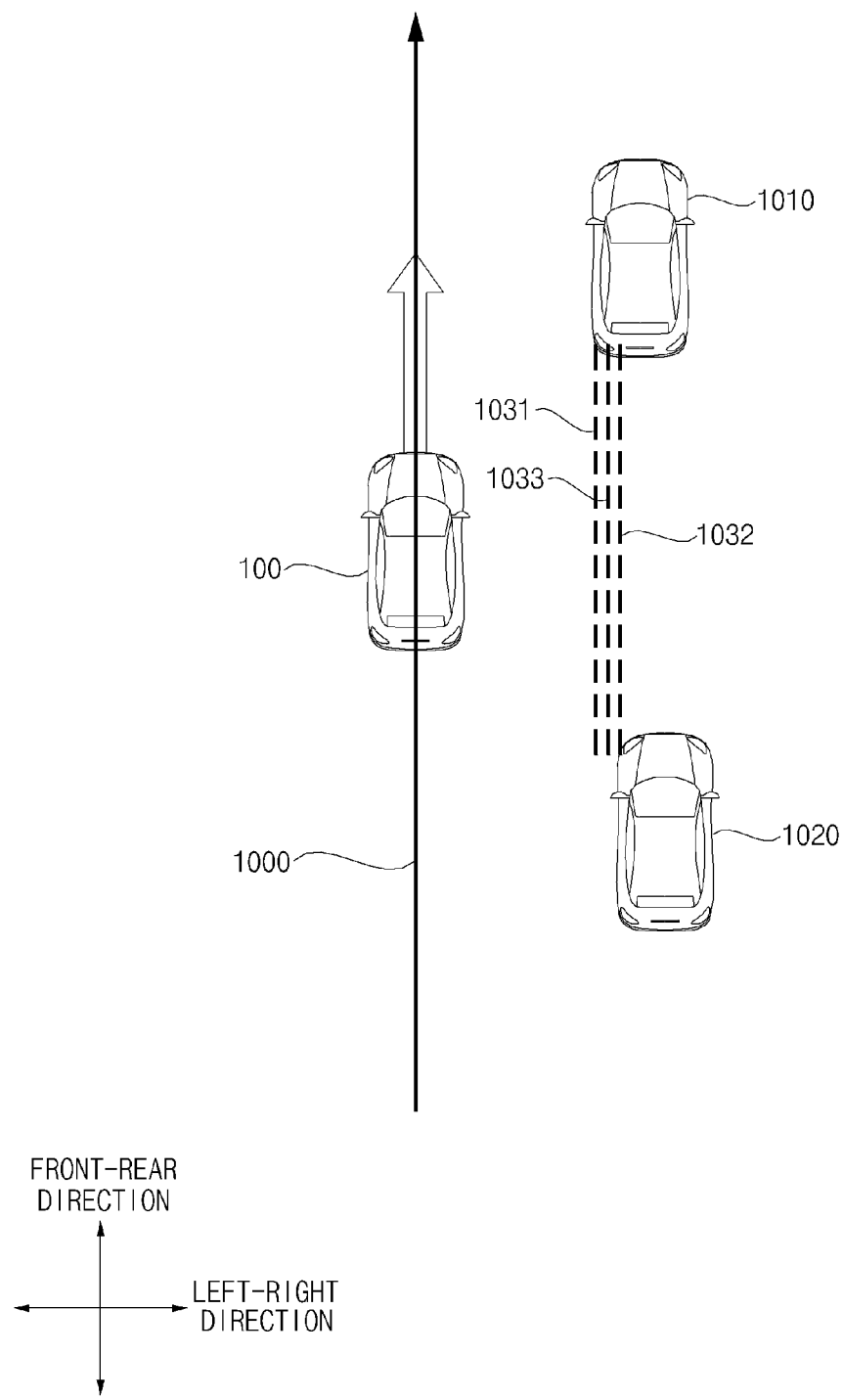

As illustrated in FIG. 18, when it is determined that the distance between the first reference line 1031 and the second reference line 1032 is beyond the preset range, the processor 757 may set a third reference line 1033 that is positioned in the middle between the first reference line 1031 and the second reference line 1032.

The processor 757 may provide a control signal so that the vehicle 100 is parallel parked with the body thereof having passed the third reference line 1033.

In some implementations, the processor 757 may provide a control signal so that the vehicle 100 is parallel parked with the body of the vehicle 100 having passed the second reference line 1032. In this case, the second reference line 1032 is spaced apart from the vehicle 100, further than the first reference line 1031, during sensing of a parking available space.

Figure 19:
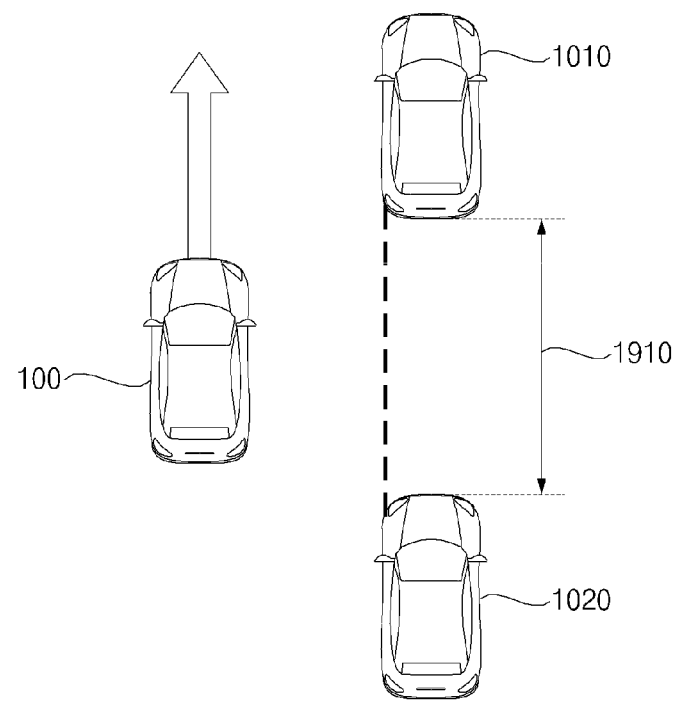
Figure 19:
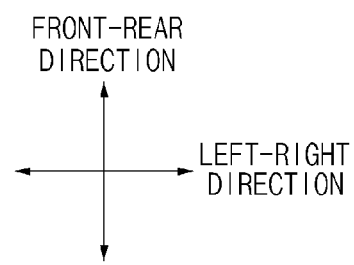

Referring to FIG. 19, the processor 757 may determine a length 1910 of a space between a first nearby vehicle 1010 and a second nearby vehicle 1020.

For example, the processor 757 may generate a depth map based on a plurality of images that is acquired while the vehicle 100 is moving during sensing of a parking available space. Based on the depth map, the processor 757 may determine the length 1910 of the space between the first nearby vehicle 1010 and the second nearby vehicle 1020.

For example, during sensing of a parking available space, based on an end time of sensing of the second nearby vehicle 1020, a start time of sensing of the first nearby vehicle 1010, and a moving speed of the vehicle 100, the processor 757 may determine the length 1910 of the space between the first nearby vehicle 1010 and the second nearby vehicle 1020.

Based on an overall length of the vehicle 100, the processor 757 may determine whether one vehicle is allowed to be parked in a space between the first nearby vehicle 1010 and the second nearby vehicle 1020.

When it is determined that one vehicle is allowed to be parked in a space between the first nearby vehicle 1010 and the second nearby vehicle 1020, the processor 757 may provide a control signal so that the vehicle 100 is parallel parked in the middle between the first nearby vehicle 1010 and the second nearby vehicle 1020.

In this case, in some implementations, the processor 757 may provide a control signal so that the vehicle 100 is parallel parked closer to the second nearby vehicle 1020 than the first nearby vehicle 1010.

Figure 20:
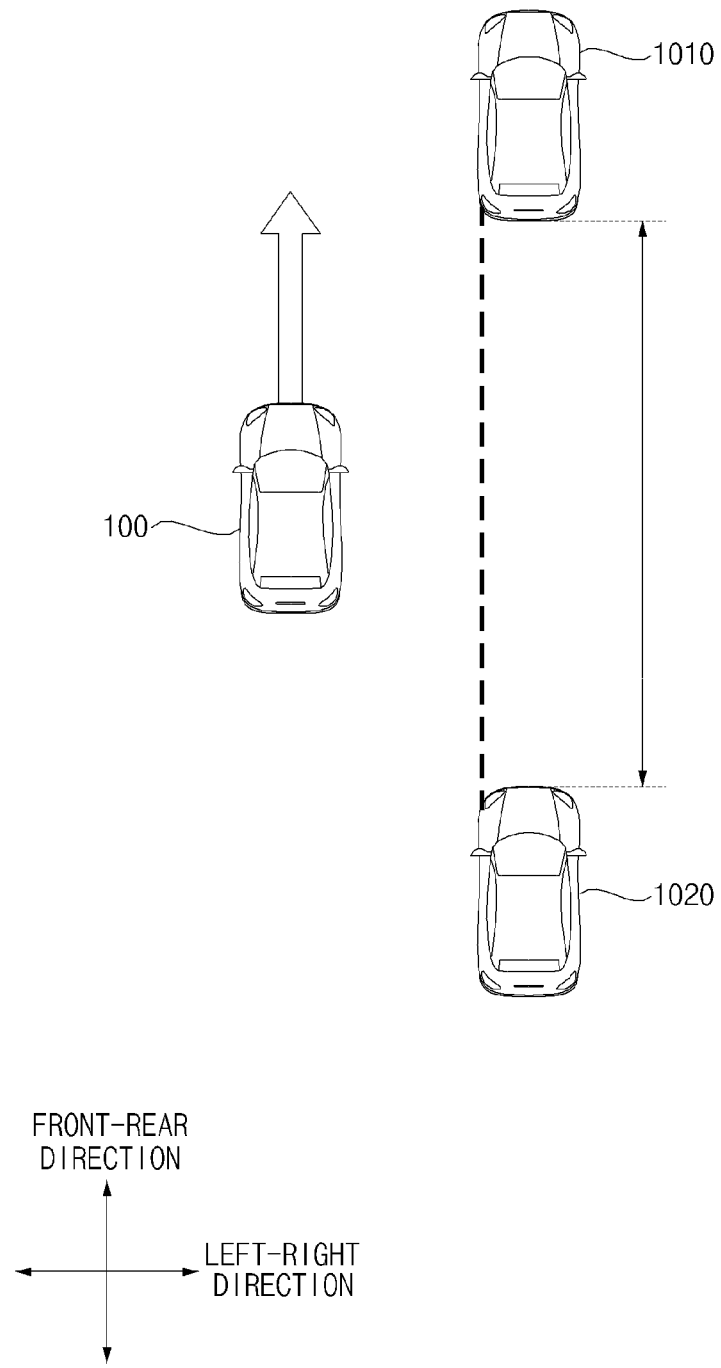

Referring to FIG. 20, based on an overall length of the vehicle 100, the processor 757 may determine whether two or more vehicles are allowed to be parked in a space between a first nearby vehicle 1010 and a second nearby vehicle 1020.

When it is determined that two or more vehicles are allowed to be parked in a space between the first nearby vehicle 1010 and the second nearby vehicle 1020, the processor 757 may provide a control signal so that the vehicle 100 is parallel parked closer to the first nearby vehicle 1010 than the second nearby vehicle 1020.

In this case, in order to secure a space to exit the vehicle 100, the processor 757 may provide a control signal so that the vehicle 100 is parallel parked with a first distance or more from the first nearby vehicle 1010.

Figure 21:
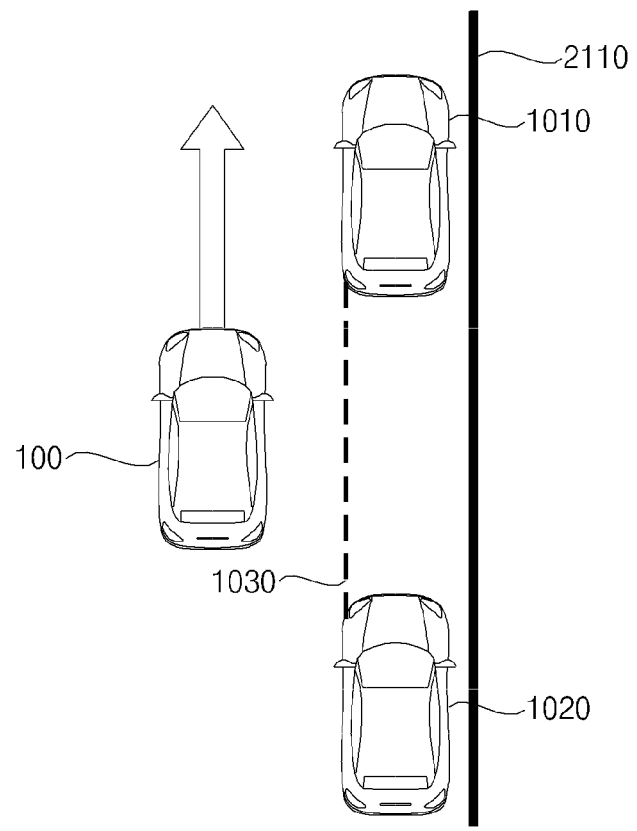
FIG. 21 is a diagram illustrating an example of an operation of a parking system in a scenario of parking a vehicle in the vicinity of a curb, according to some implementations.
Figure 21:
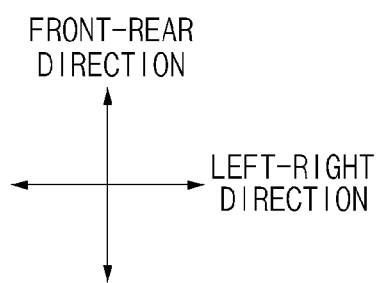

FIG. 21 is a diagram illustrating operation of a parking system when parking a vehicle in the vicinity of a curb, according to an implementation.

Referring to FIG. 21, the object detection apparatus 300 may detect a curb 2110 as well as nearby vehicles 1010 and 1020.

The processor 757 may provide a control signal so that the vehicle 100 is parallel parked within a first distance range from the curb 2110 with the body of the vehicle 100 having passed a virtual reference line 1030.

The processor 757 may acquire information as to whether there is a person sitting in the passenger seat.

The passenger seat is a seat next to a driver's seat.

Based on the information as to whether there is a person sitting in the passenger seat, the processor 757 may adjust a first distance range.

For example, when there is no person sitting in the passenger seat, the processor 757 may adjust the first distance range such that an upper bound and a lower bound of the first distance range are greater than those when there is a person sitting in the passenger seat.

In some implementations, the processor 757 may acquire information about a height of the curb 2110.

Based on the information about a height of the curb 2110, the processor 757 may determine whether an opened door of the vehicle 100 would hit the curb 2110.

The processor 757 may adjust the first distance range based on the information about a height of the curb 2110.

For example, the processor 757 may adjust the first distance range such that an upper bound and a lower bound of the first distance range are greater than those when an opened door of the vehicle does not hit the curb 2110.

Figure 22:
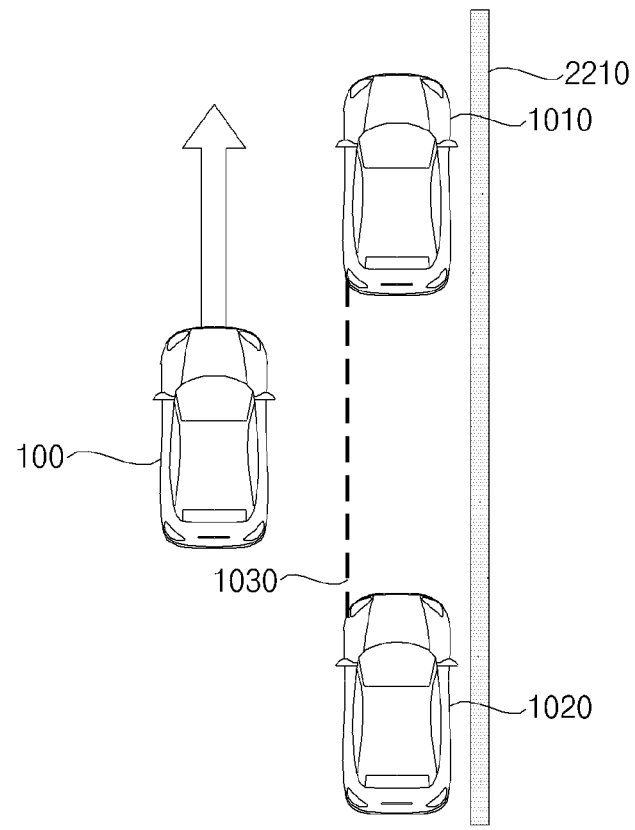
FIG. 22 is a diagram illustrating an example of an operation of a parking system in a scenario of parking a vehicle in the vicinity of a wall, according to an implementation.
Figure 22:
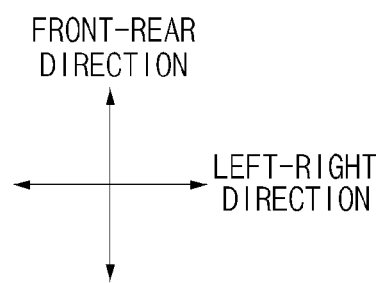

FIG. 22 is a diagram illustrating operation of a parking system in the case of parking a vehicle in the vicinity of a wall, according to an implementation.

Referring to FIG. 22, the object detection apparatus 300 may detect a wall 2210 as well as nearby vehicles 1010 and 1020.

The processor 757 may provide a control signal so that the vehicle 100 is parallel parked within a second distance range from a curb with the body of the vehicle 100 having passed a virtual reference line 1030.

The second distance range may be greater than the first distance range described with reference to FIG. 21.

When the vehicle 100 is parallel parked next to a curb, it is possible to open a door of the passenger seat depending on a height of the curb.

When the vehicle 100 is parallel parked too close to the wall 2210, it is not possible to open a door of the passenger seat.

The processor 757 may adjust the second distance range based on information as to whether there is a person sitting in the passenger seat.

For example, when there is no person sitting in the passenger seat, the processor 757 may adjust the second distance range such that an upper bound and a lower bound of the second distance range are greater than those when there is no person sitting in the passenger seat.

The present disclosure as described above may be implemented as code that is written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include at least one processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A parking system for a subject vehicle configured to perform a parallel parking maneuver, the parking system comprising:
   at least one processor; and
   a computer-readable medium having stored thereon instructions that, when executed by the at least one processor, cause the at least one processor to perform operations comprising:
      receiving information regarding at least one nearby parked vehicle from an object detection apparatus;
      setting at least one edge point of the at least one nearby parked vehicle based on the information regarding the at least one nearby parked vehicle, wherein the at least one edge point
   is farthest in a left-right direction from the subject vehicle, on an exterior side of the nearby parked vehicle, wherein the exterior side is closest to the subject vehicle during sensing of an available parking space, and wherein the left-right direction is defined as an overall width direction of the subject vehicle;
      setting a reference line based on the at least one edge point of the at least one nearby parked vehicle; and
      providing a control signal to control the subject vehicle to perform a parallel parking maneuver with a plurality of wheels of the subject vehicle passing through the reference line,
   wherein the operations further comprise:
      receiving first information regarding a first nearby parked vehicle, and second information regarding a second nearby parked vehicle from the object detection apparatus, and
      providing the control signal to control the subject vehicle to perform the parallel parking maneuver so that the subject vehicle is parallel parked in a space between the first nearby parked vehicle and the second nearby parked vehicle,
   wherein setting the at least one edge point of the at least one nearby parked vehicle comprises:
      setting a first edge point of the first nearby parked vehicle based on the first information, and
      setting a second edge point of the second nearby parked vehicle based on the second information,
   wherein setting the reference line based on the at least one edge point of the at least one nearby parked vehicle comprises:
      setting a first reference line, during sensing of a parking space, to extend from the first edge point of the first nearby parked vehicle in a front-rear direction along a heading direction of the subject vehicle, and
      setting a second reference line, during sensing of the available parking space, to extend from the second edge point of the second nearby parked vehicle in the front-rear direction along the heading direction of the subject vehicle, and
   wherein providing the control signal to control the subject vehicle to perform the parallel parking maneuver comprises:
      based on the first reference line and the second reference line coinciding with each other, providing the control signal to control the subject vehicle to perform the parallel parking maneuver so that the subject vehicle is parallel parked with the plurality of wheels of the subject vehicle passing through the first reference line, and
      based on the first reference line and the second reference line not coinciding with each other, setting a third reference line positioned in a middle portion between the first reference line and the second reference line and providing the control signal to control the subject vehicle to perform the parallel parking maneuver so that the subject vehicle is parallel parked with the plurality of wheels of the subject vehicle passing through the third reference line.

2. The parking system according to claim 1, wherein the operations further comprise:
   based on the reference line and based on a direction of orientation in which the subject vehicle will be oriented upon completion of parking, generating information regarding a predicted position that the subject vehicle will be in upon completion of parking; and
   providing the control signal to control the subject vehicle to perform the parallel parking maneuver based on the information regarding the predicted position of the subject vehicle.

3. The parking system according to claim 2, wherein generating the information regarding the predicted position of the subject vehicle comprises:
   generating the information regarding the predicted position so that the subject vehicle, when parked, has a direction of orientation between −7 degrees and +7 degrees relative to the set reference line.

4. The parking system according to claim 2, wherein the operations further comprise:
   receiving information regarding a structure determined to be nearby the set reference line from the object detection apparatus; and
   generating the information regarding the predicted position of the subject vehicle such that, in the predicted position of the subject vehicle, a portion of the subject vehicle that is closest to the structure is greater than a threshold distance from the structure.

5. The parking system according to claim 1, wherein the operations further comprise:
   receiving information regarding a curb adjacent to the at least one nearby parked vehicle from the object detection apparatus;
   based on information regarding the curb adjacent to the at least one nearby parked vehicle and based on the information regarding a direction of orientation in which the subject vehicle will be oriented upon completion of parking, generating information about a predicted position that the subject vehicle will be in upon completion of parking; and
   providing the control signal so that the subject vehicle is parked based on the information about the predicted position that the subject vehicle will be in upon completion of parking.

6. The parking system according to claim 5, wherein generating the information regarding the predicted position of the subject vehicle comprises:
   generating the information regarding the predicted position so that the subject vehicle, when parked, has a direction of orientation between −7 degrees and +7 degrees relative to a line that defines a longitudinal edge of the curb adjacent to the at least one nearby parked vehicle.

7. The parking system according to claim 1, wherein setting the at least one edge point of the at least one nearby parked vehicle comprises:
   comparing a travelling trajectory of the subject vehicle and a position of the at least one nearby parked vehicle during sensing of the available parking space.

8. The parking system according to claim 1, wherein the operations further comprise:
- receiving information regarding a first nearby parked vehicle from the objection detection apparatus;
- during sensing of the available parking space, setting a first edge point for the first nearby parked vehicle as a portion of a first exterior side of the first nearby parked vehicle that is farthest from the subject vehicle in the left-right direction, wherein the first exterior side of the first nearby parked vehicle being an exterior side of the first nearby parked vehicle that is closest to the subject vehicle among an exterior front side, an exterior rear side, an exterior left side, and an exterior right side of the first nearby parked vehicle;
- setting the reference line for the parallel parking maneuver to extend in a front-rear direction from the first edge point of the first nearby parked vehicle; and
- providing the control signal to control the subject vehicle to perform the parallel parking maneuver toward a front side or a rear side of the first nearby parked vehicle based on the reference line.

9. The parking system according to claim 1, wherein providing the control signal to control the subject vehicle to perform the parallel parking maneuver comprises:
- based on the space between the first nearby parked vehicle and the second nearby parked vehicle having a size corresponding to parking a single vehicle, providing the control signal so that the subject vehicle is parallel parked in a middle portion between the first nearby parked vehicle and the second nearby parked vehicle.

10. The parking system according to claim 1, wherein providing the control signal to control the subject vehicle to perform the parallel parking maneuver comprises:
- based on the space between the first nearby parked vehicle and the second nearby parked vehicle having a size corresponding to parking two or more vehicles, providing the control signal so that the subject vehicle is parallel parked closer to the first nearby parked vehicle than the second nearby parked vehicle.

11. The parking system according to claim 1, wherein the operations further comprise:
- receiving information regarding a curb that is adjacent to the at least one nearby parked vehicle from the object detection apparatus; and
- providing the control signal to control the subject vehicle to perform the parallel parking maneuver so that the subject vehicle is parallel parked within a first distance range from the curb that is adjacent to the at least one nearby parked vehicle.

12. The parking system according to claim 11, wherein the operations further comprise:
- receiving information regarding whether there is a person sitting in a passenger seat of the subject vehicle; and
- based on the information regarding whether there is a person sitting in the passenger seat of the subject vehicle, adjusting the first distance range within which the subject vehicle is parallel parked from the curb that is adjacent to the at least one nearby parked vehicle.

13. The parking system according to claim 1, wherein the operations further comprise:
- receiving information regarding a wall that is adjacent to the at least one nearby parked vehicle from the object detection apparatus; and
- providing the control signal to control the subject vehicle to perform the parallel parking maneuver so that the subject vehicle is parallel parked within a second distance range from the wall that is adjacent to the at least one nearby parked vehicle.

14. The parking system according to claim 13, wherein the operations further comprise:
- receiving information regarding whether there is a person sitting in a passenger seat of the subject vehicle; and
- based on the information regarding whether there is a person sitting in the passenger seat of the subject vehicle, adjusting the second distance range within which the subject vehicle is parked from the wall that is adjacent to the at least one nearby parked vehicle.

* * * * *